AUTOMATIC TOLL TICKETING TELEPHONE SYSTEM

Filed Nov. 21, 1960 21 Sheets-Sheet 1

INVENTOR.
EDWARD J. GLENNER
BY C. A. Gulbrandsen
Atty.

June 9, 1964 E. J. GLENNER 3,136,857

AUTOMATIC TOLL TICKETING TELEPHONE SYSTEM

Filed Nov. 21, 1960 21 Sheets-Sheet 3

June 9, 1964 E. J. GLENNER 3,136,857

AUTOMATIC TOLL TICKETING TELEPHONE SYSTEM

Filed Nov. 21, 1960 21 Sheets-Sheet 4

June 9, 1964 E. J. GLENNER 3,136,857

AUTOMATIC TOLL TICKETING TELEPHONE SYSTEM

Filed Nov. 21, 1960

21 Sheets-Sheet 5

June 9, 1964 E. J. GLENNER 3,136,857

AUTOMATIC TOLL TICKETING TELEPHONE SYSTEM

Filed Nov. 21, 1960 21 Sheets-Sheet 6

June 9, 1964 E. J. GLENNER 3,136,857

AUTOMATIC TOLL TICKETING TELEPHONE SYSTEM

Filed Nov. 21, 1960 21 Sheets-Sheet 8

June 9, 1964 E. J. GLENNER 3,136,857

AUTOMATIC TOLL TICKETING TELEPHONE SYSTEM

Filed Nov. 21, 1960 21 Sheets-Sheet 14

June 9, 1964 E. J. GLENNER 3,136,857

AUTOMATIC TOLL TICKETING TELEPHONE SYSTEM

Filed Nov. 21, 1960 21 Sheets-Sheet 16

June 9, 1964 E. J. GLENNER 3,136,857
AUTOMATIC TOLL TICKETING TELEPHONE SYSTEM
Filed Nov. 21, 1960 21 Sheets-Sheet 21

3,136,857

AUTOMATIC TOLL TICKETING TELEPHONE SYSTEM

Edward J. Glenner, Skokie, Ill., assignor to Automatic Electric Laboratories, Inc., Northlake, Ill., a corporation of Delaware Filed Nov. 21, 1960, Ser. No. 70,526
22 Claims. (Cl. 179—7.1)

Figure 1:
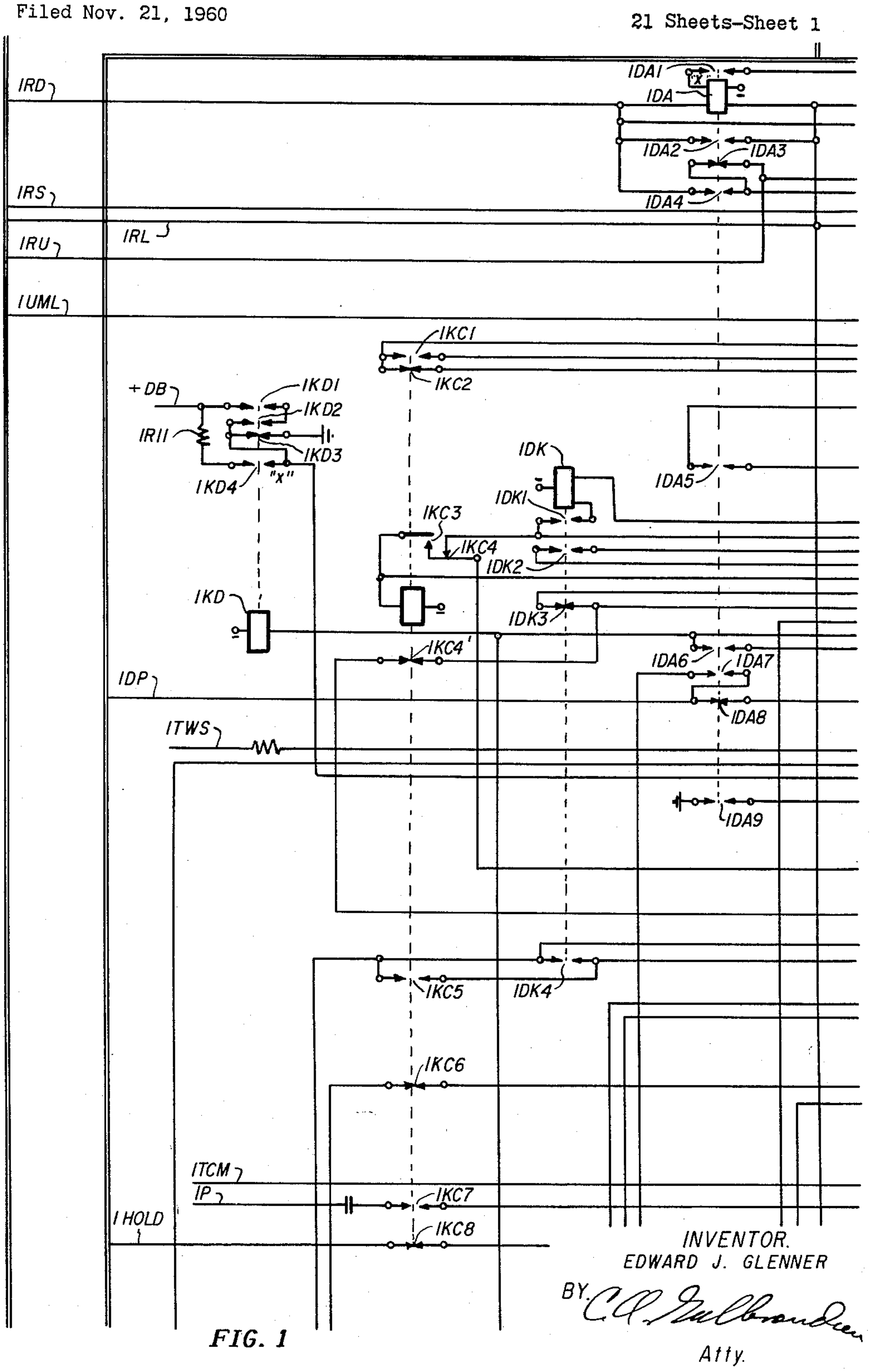
Figure 2:
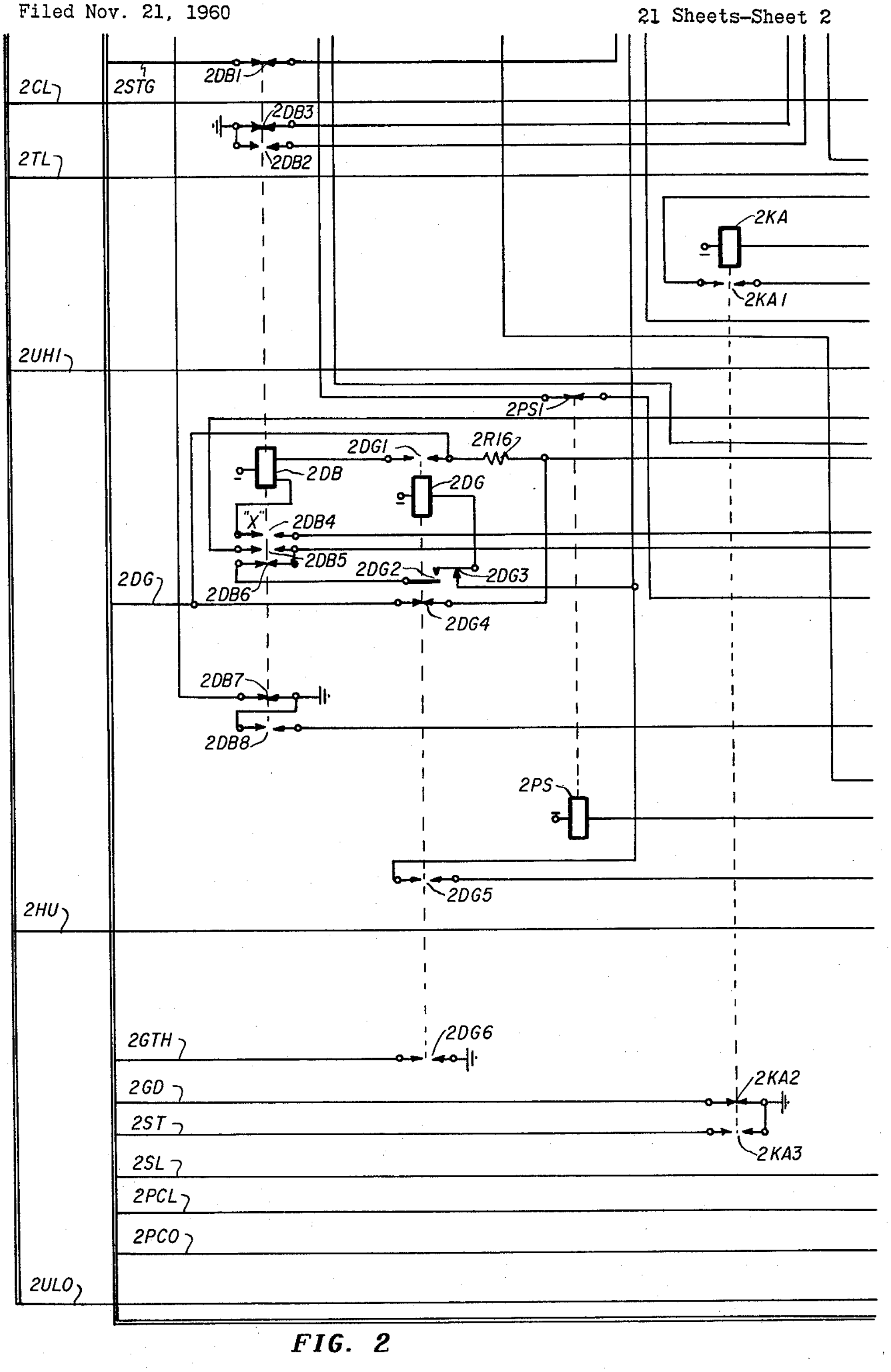
Figure 3:
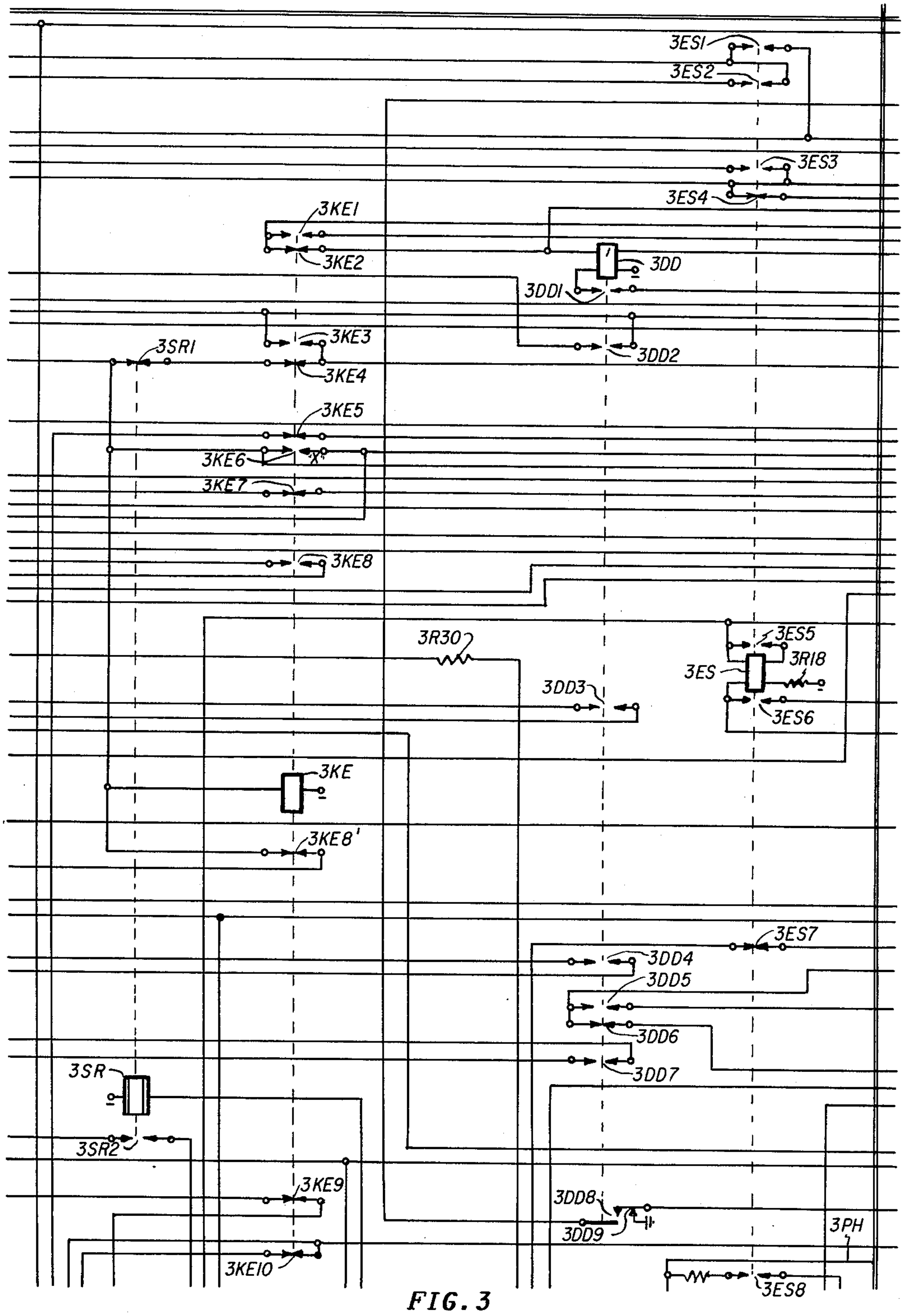
Figure 4:
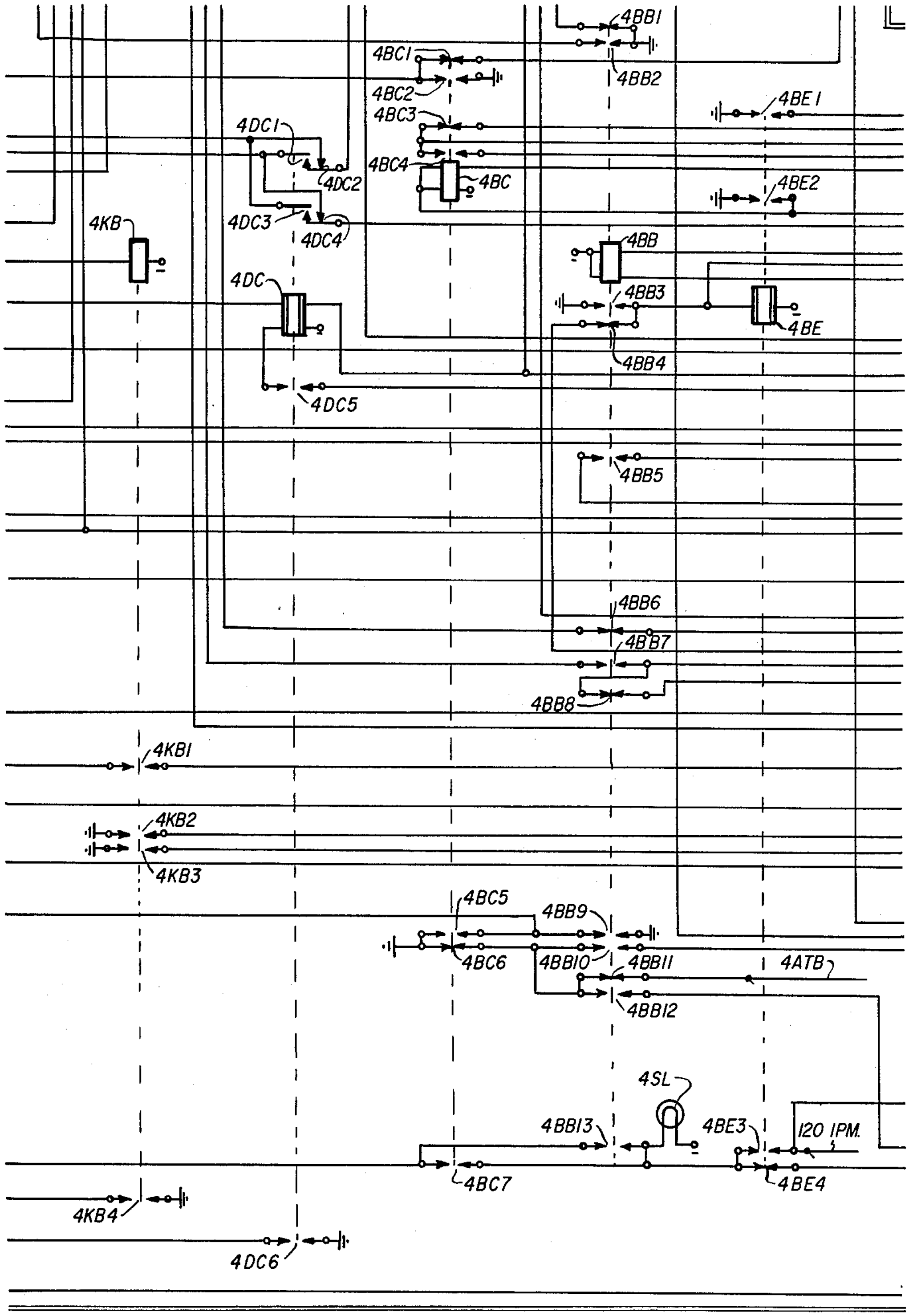
Figure 5:
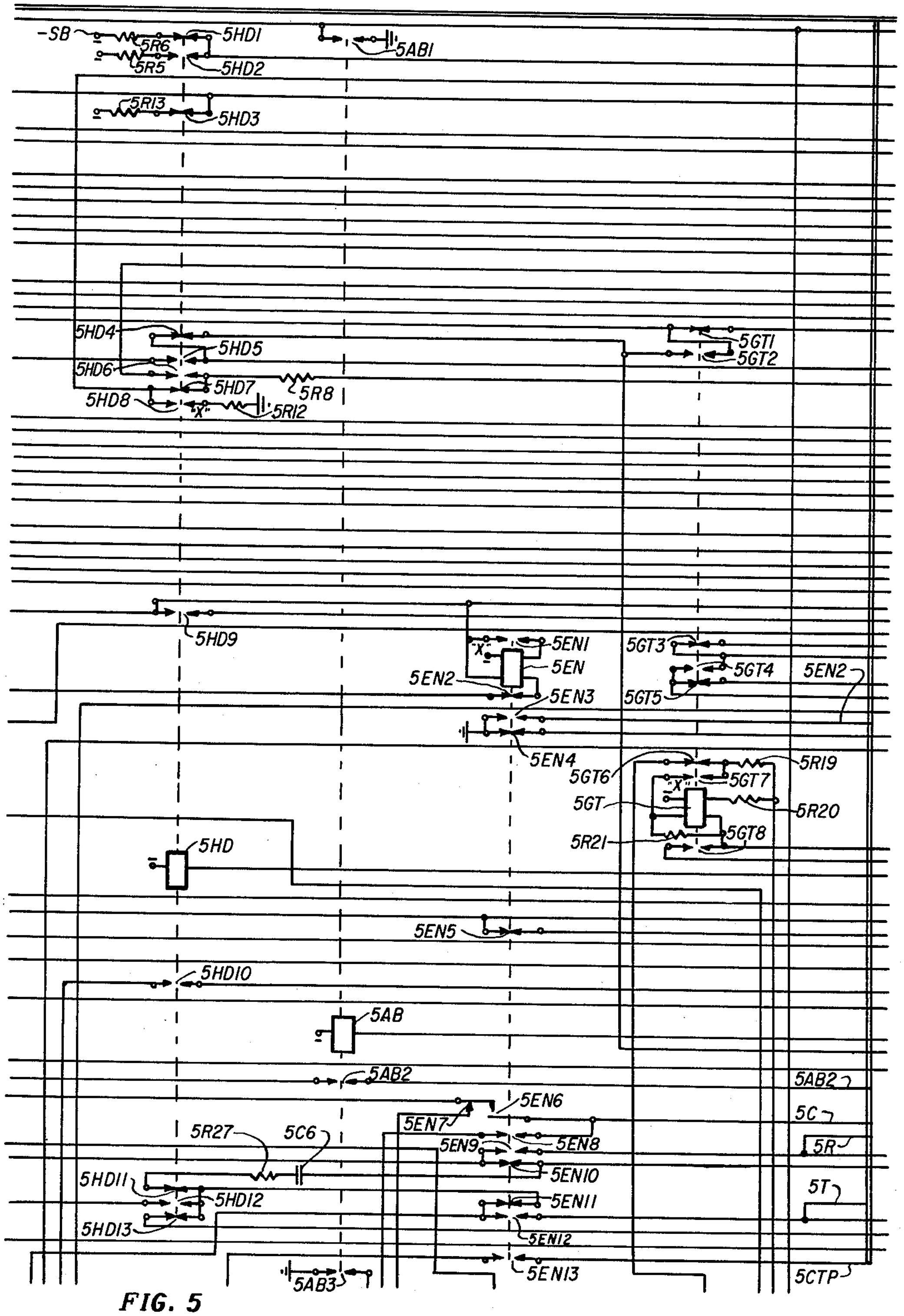
Figure 6:
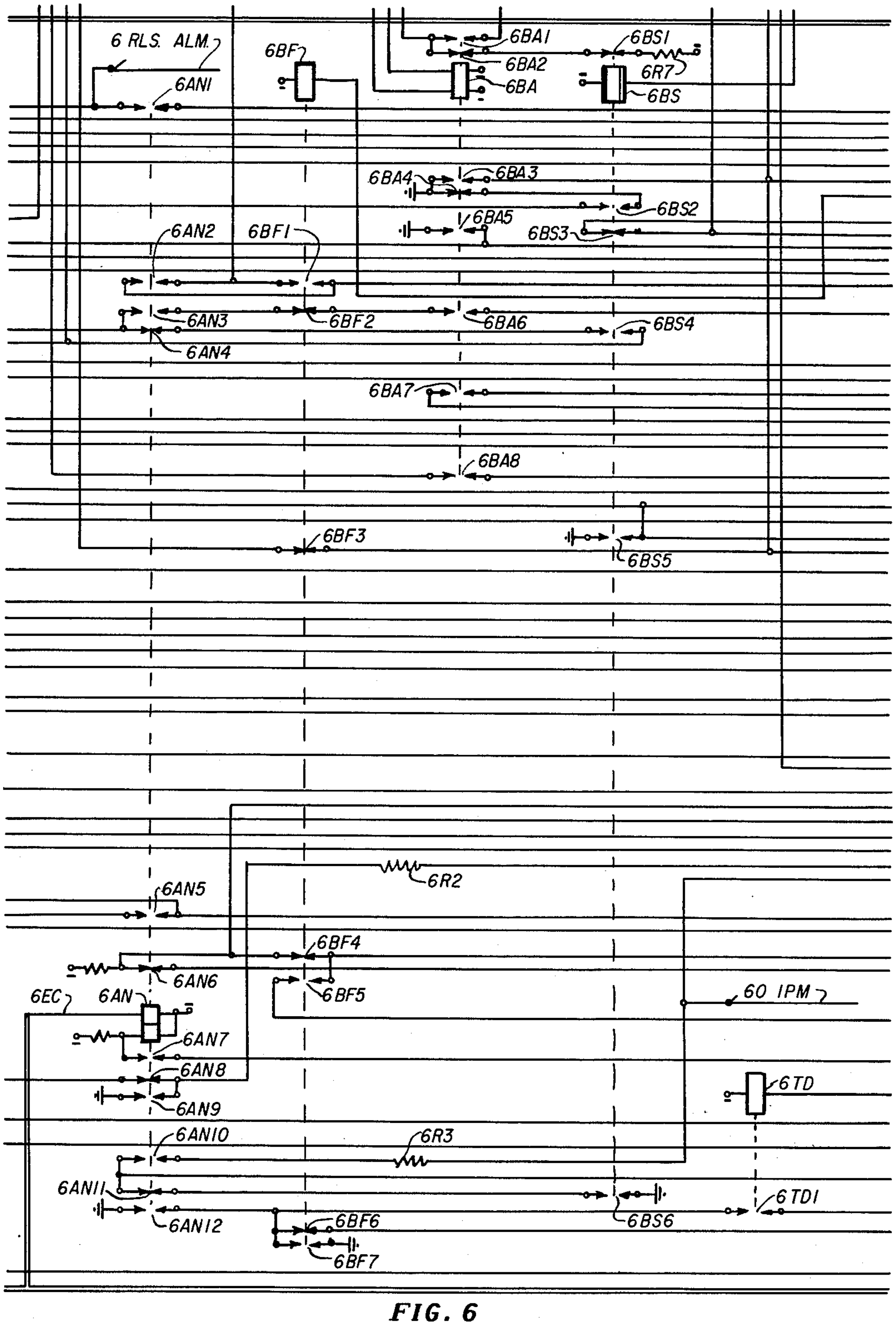
Figure 7:
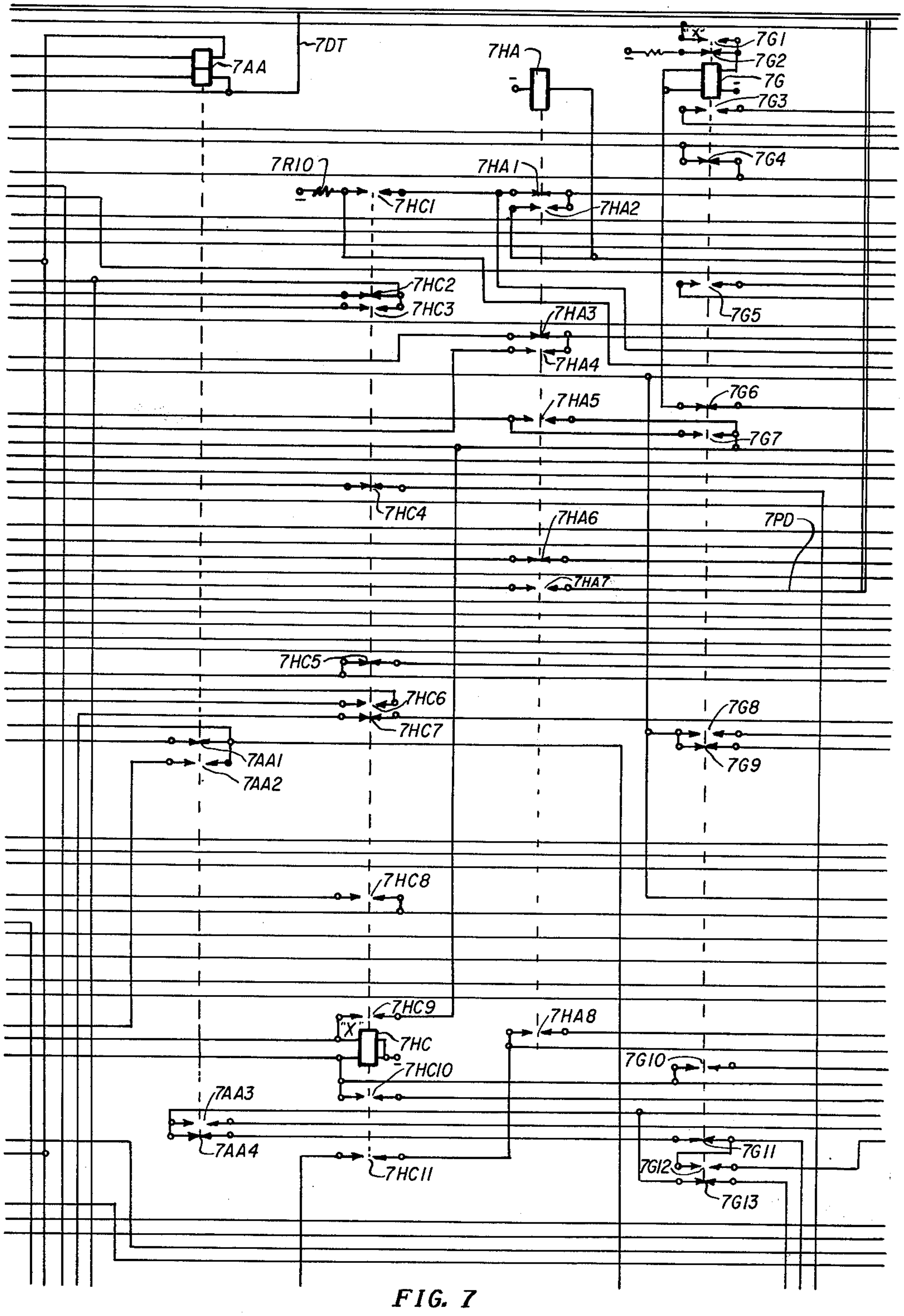
Figure 8:
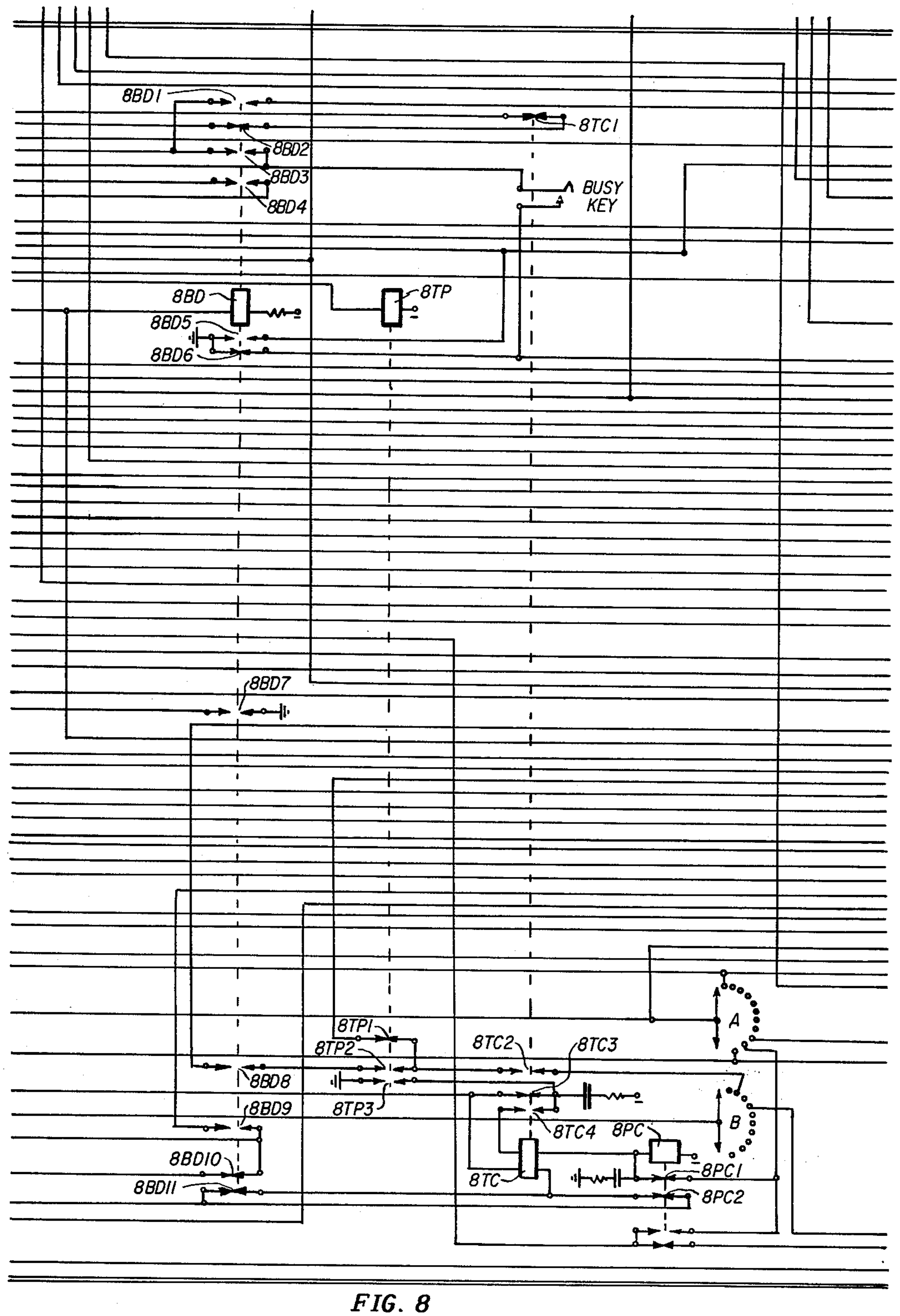
Figure 9:
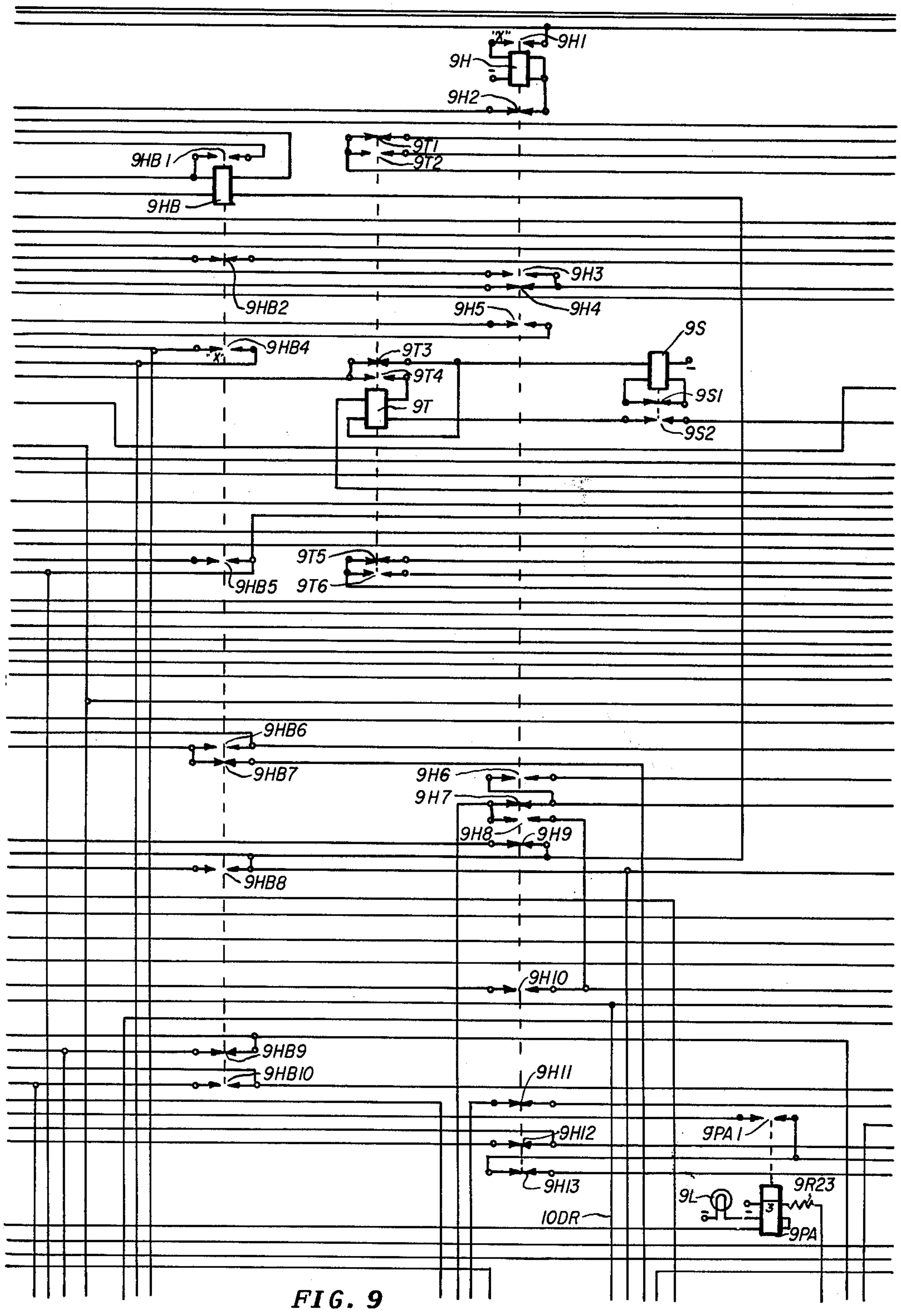
Figure 10:
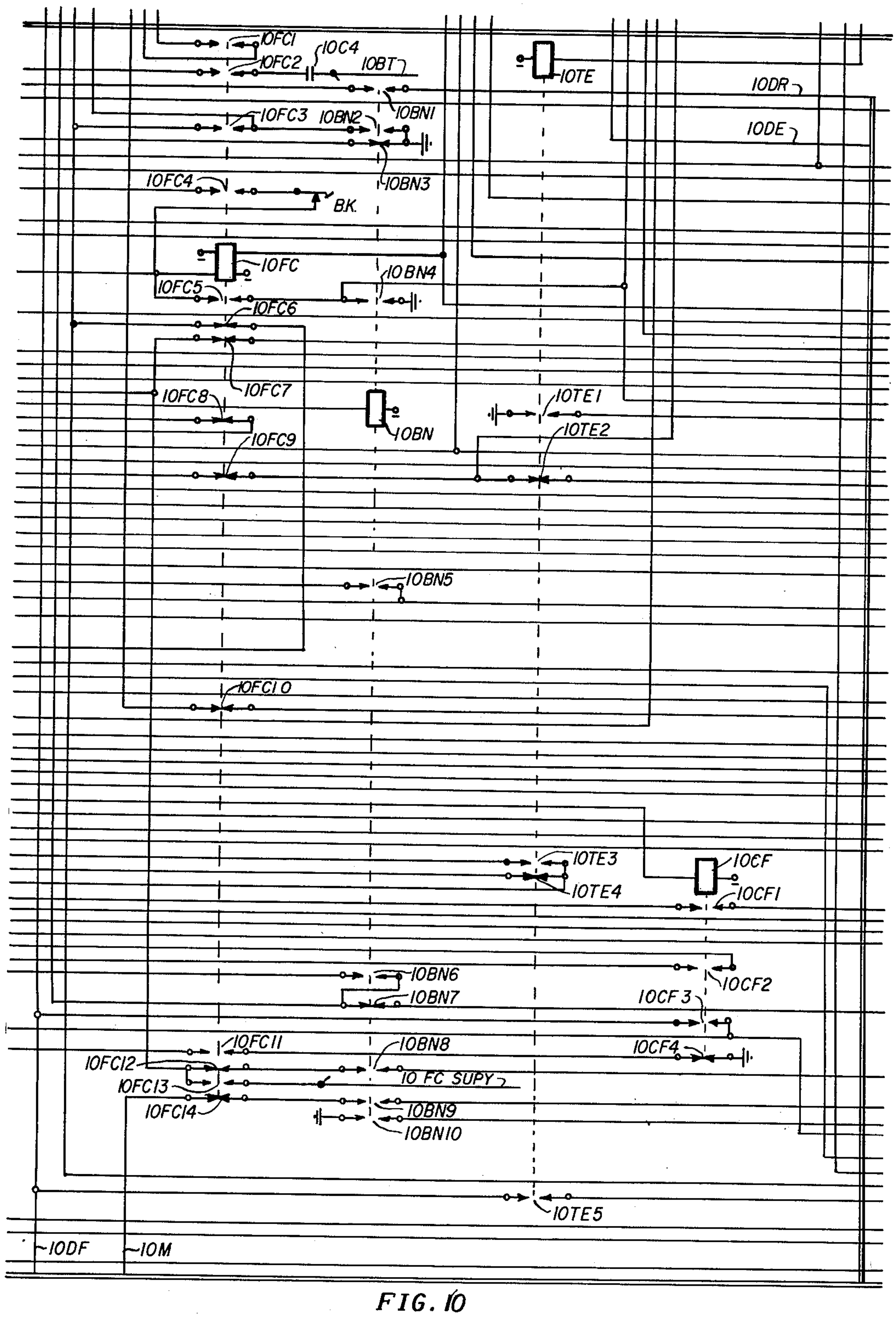
Figure 11:
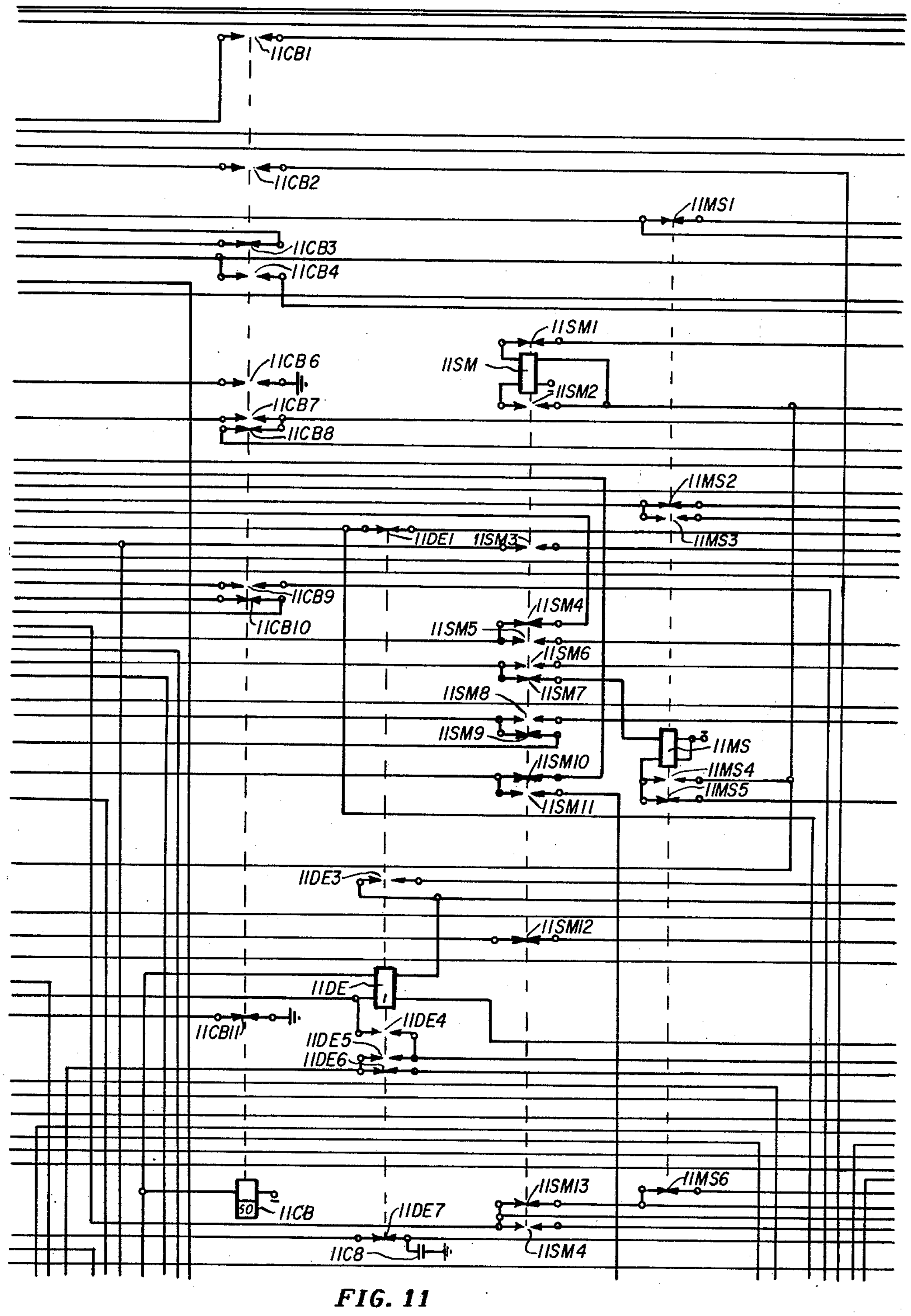
Figure 12:
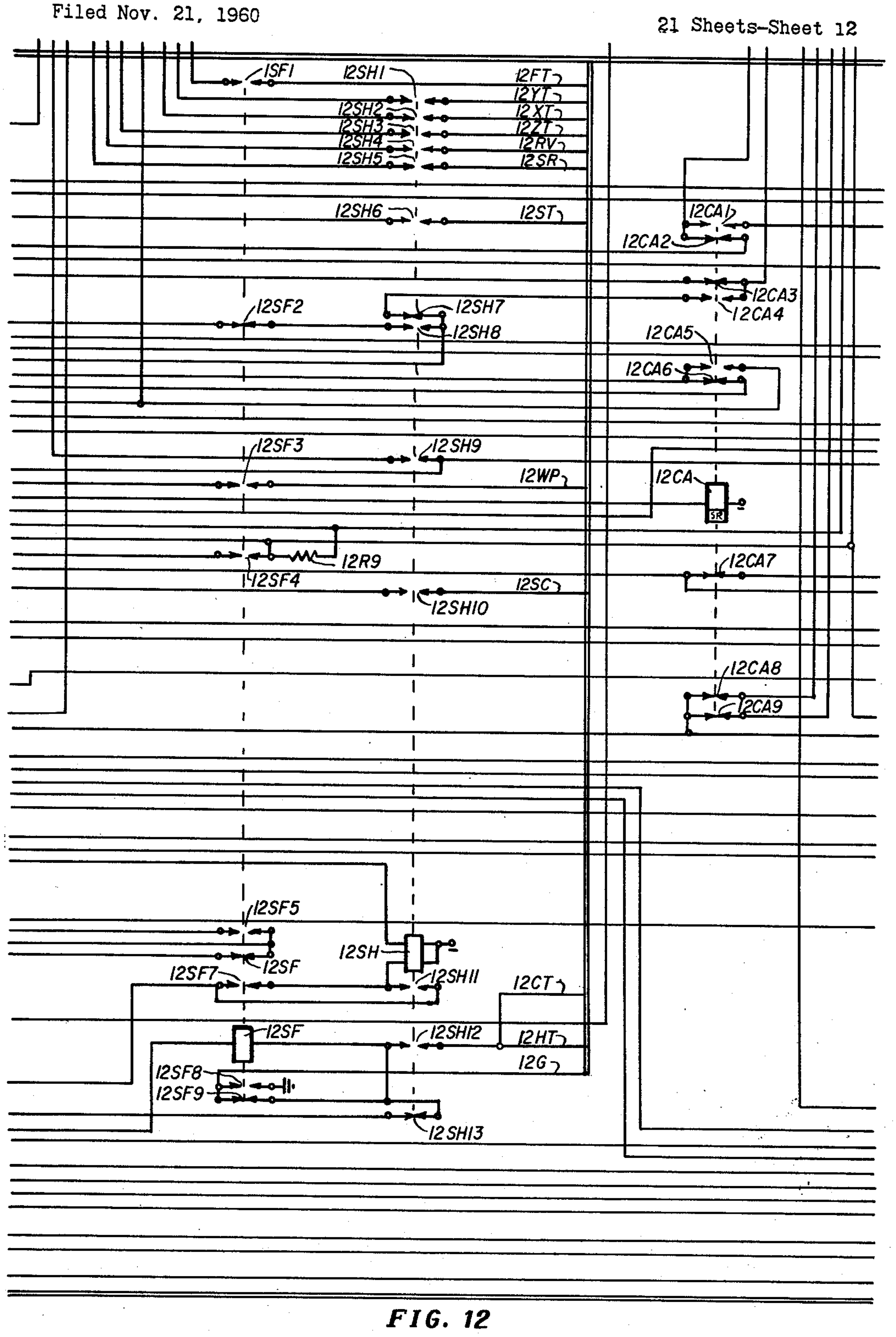
Figure 13:
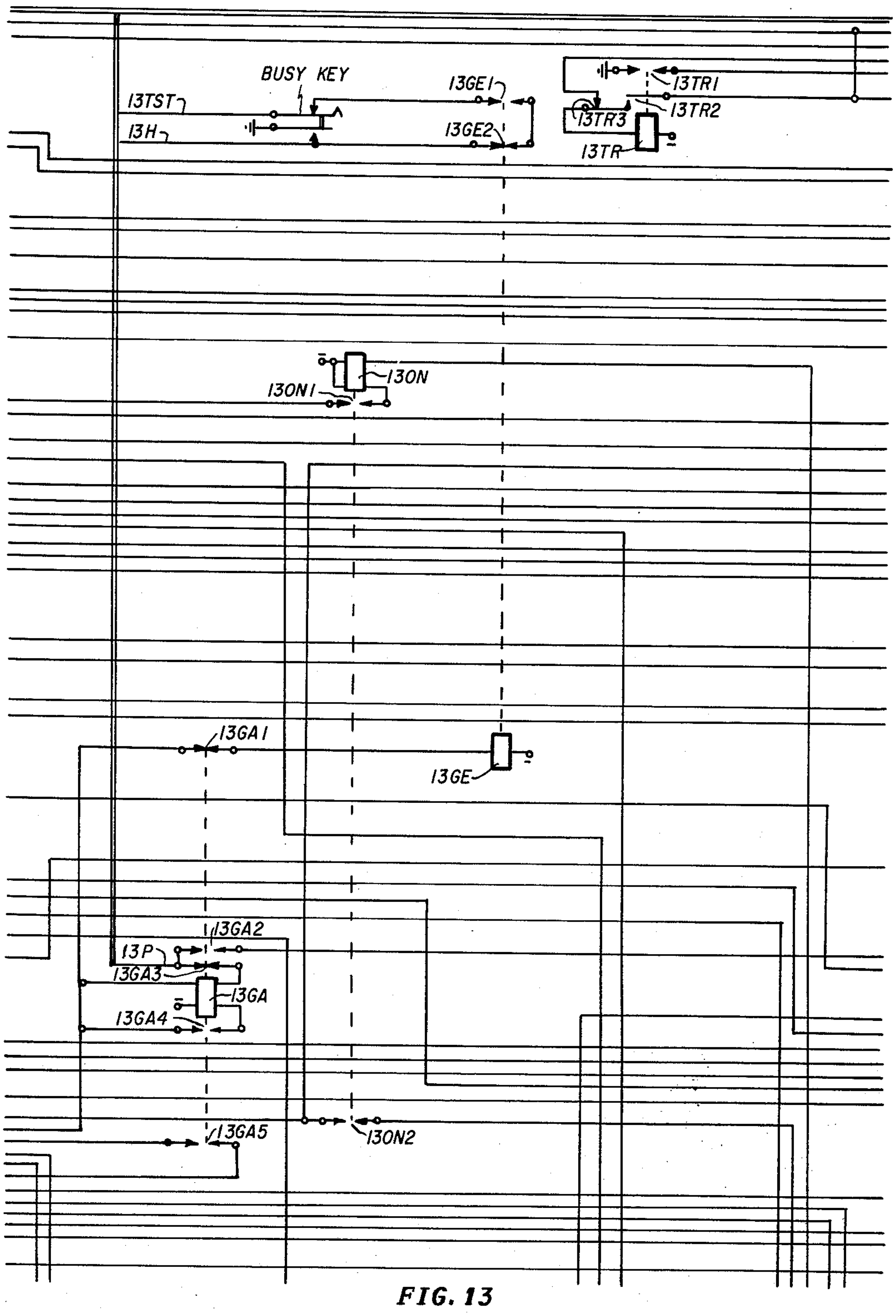
Figure 14:
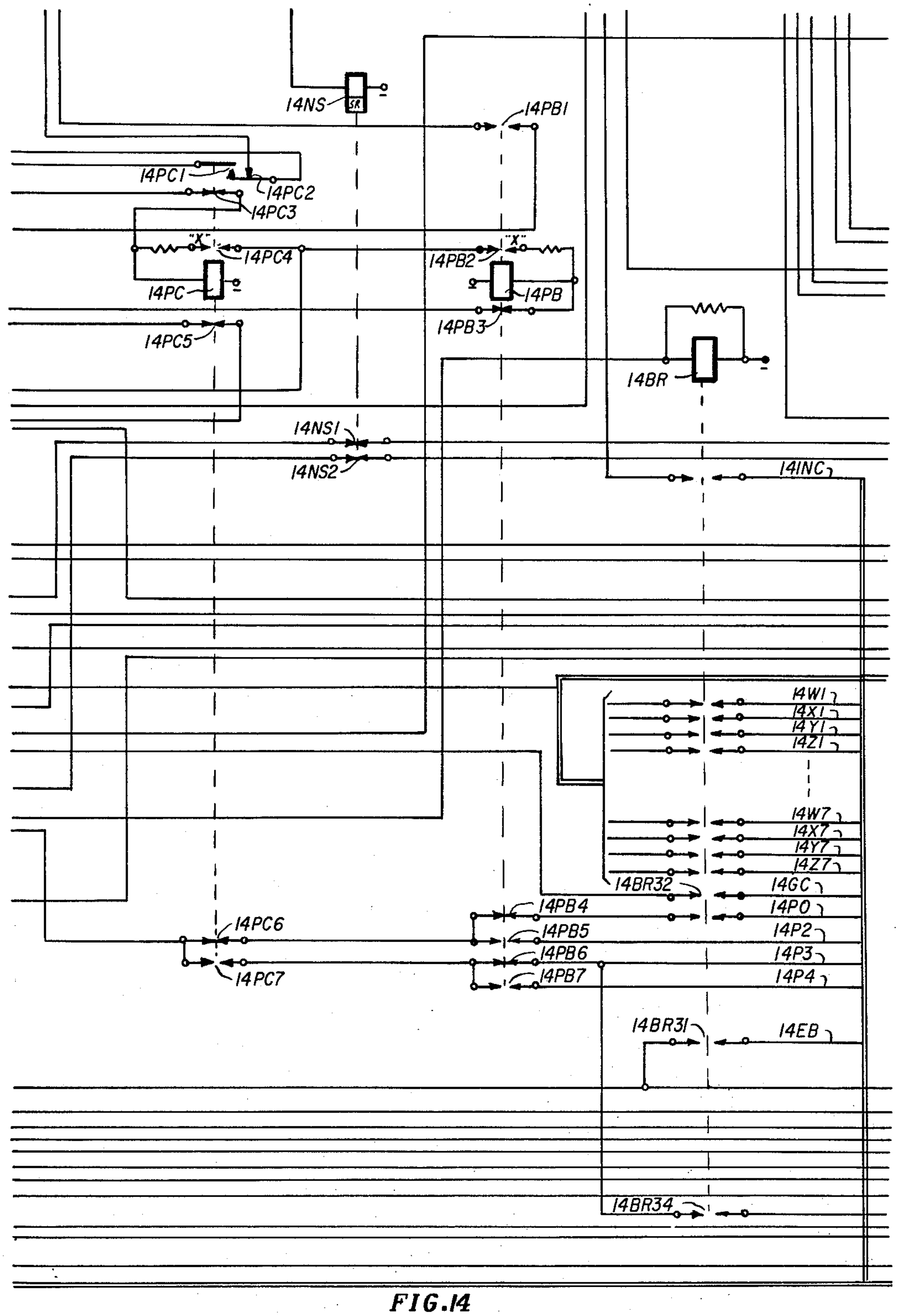
Figure 15:
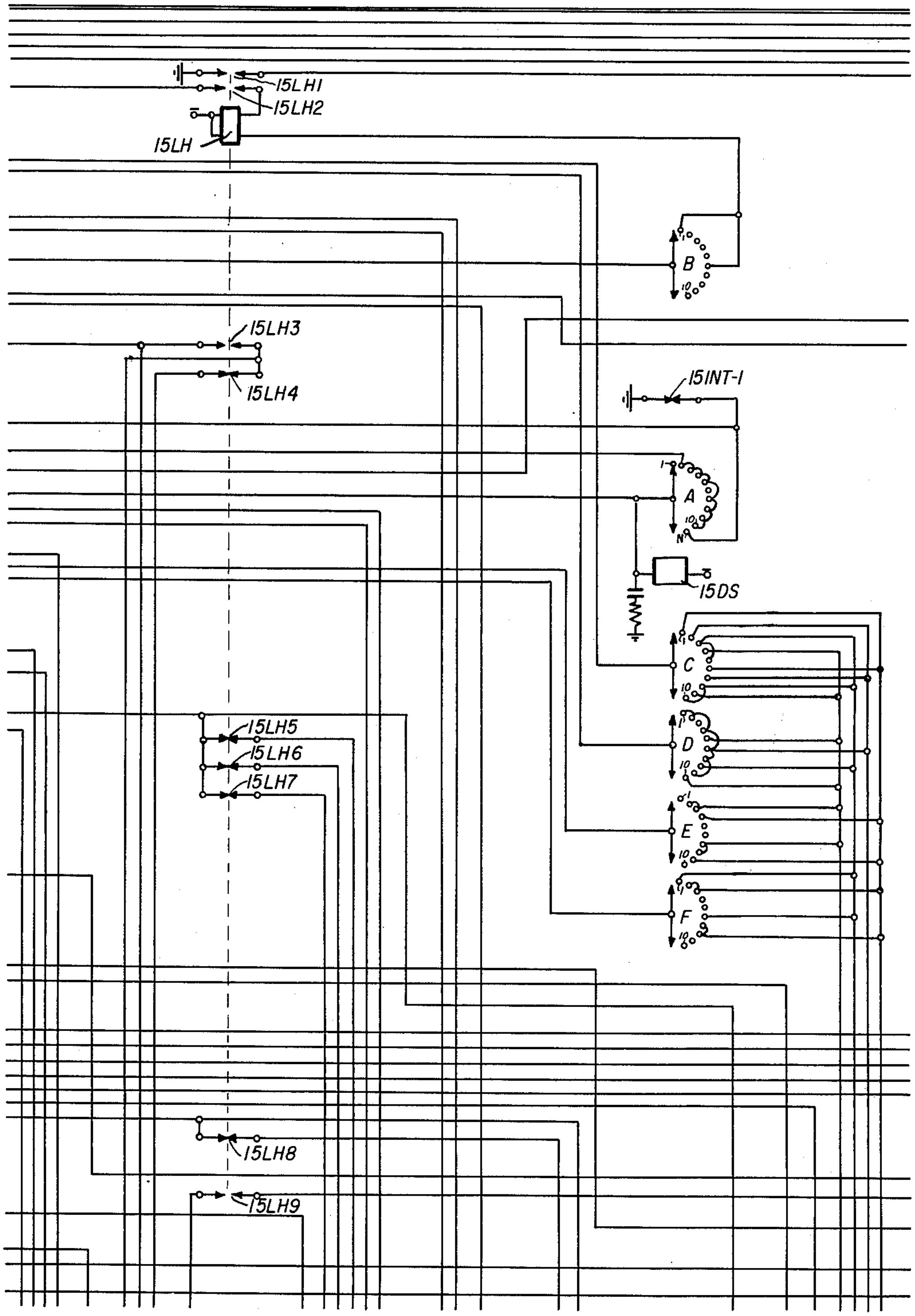
Figure 16:
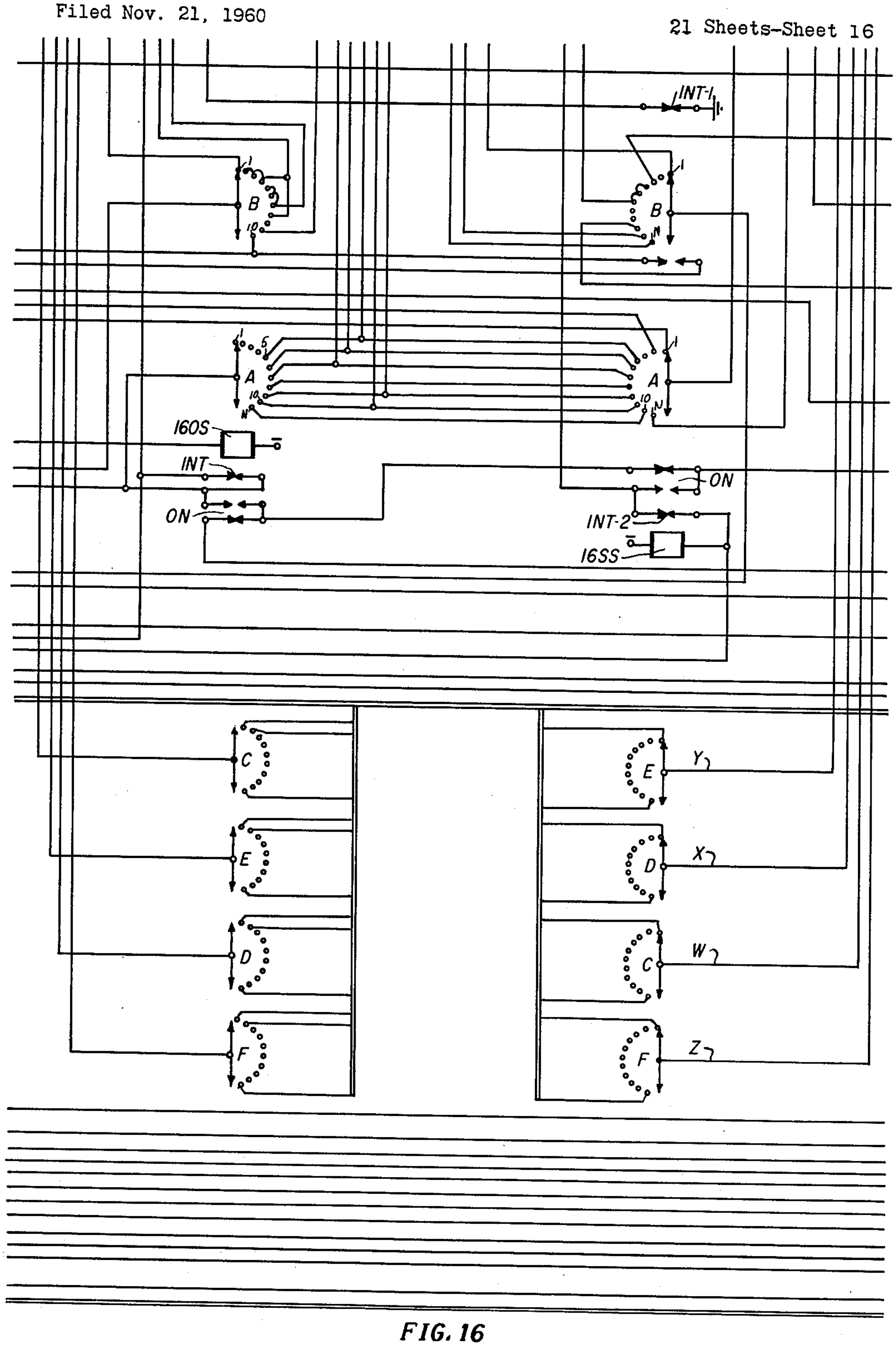
Figure 17:
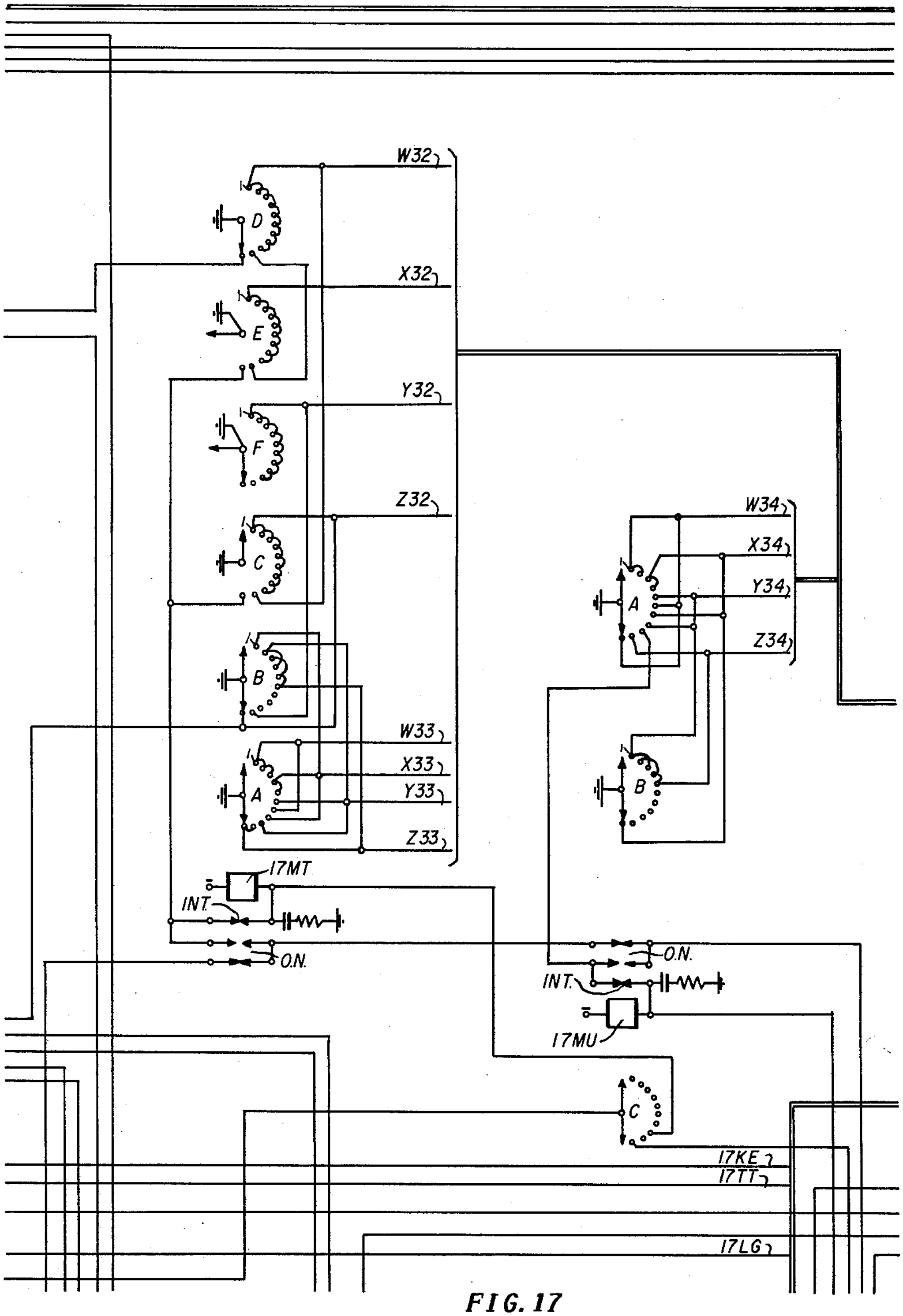
Figure 18:
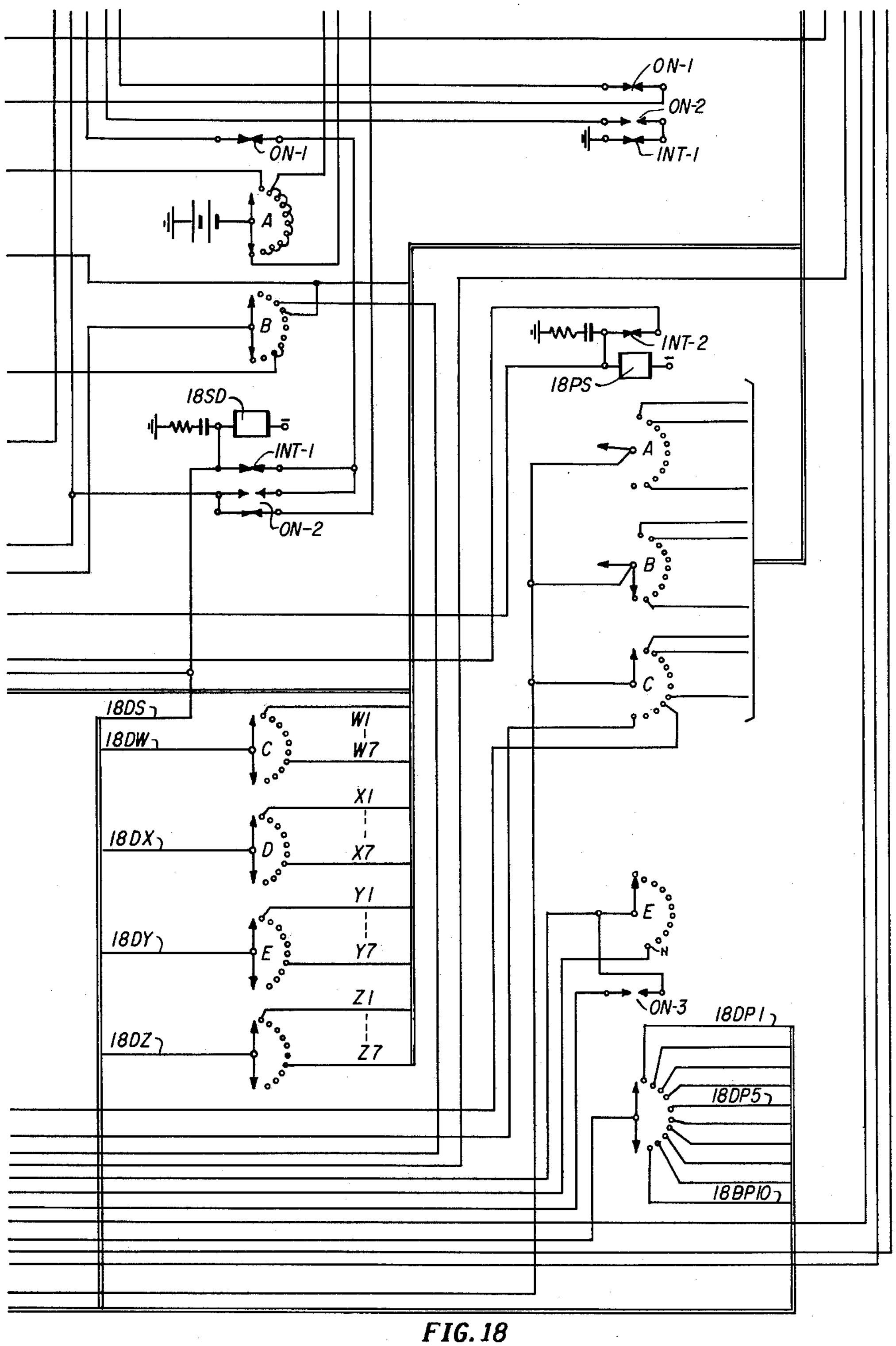
Figure 19:
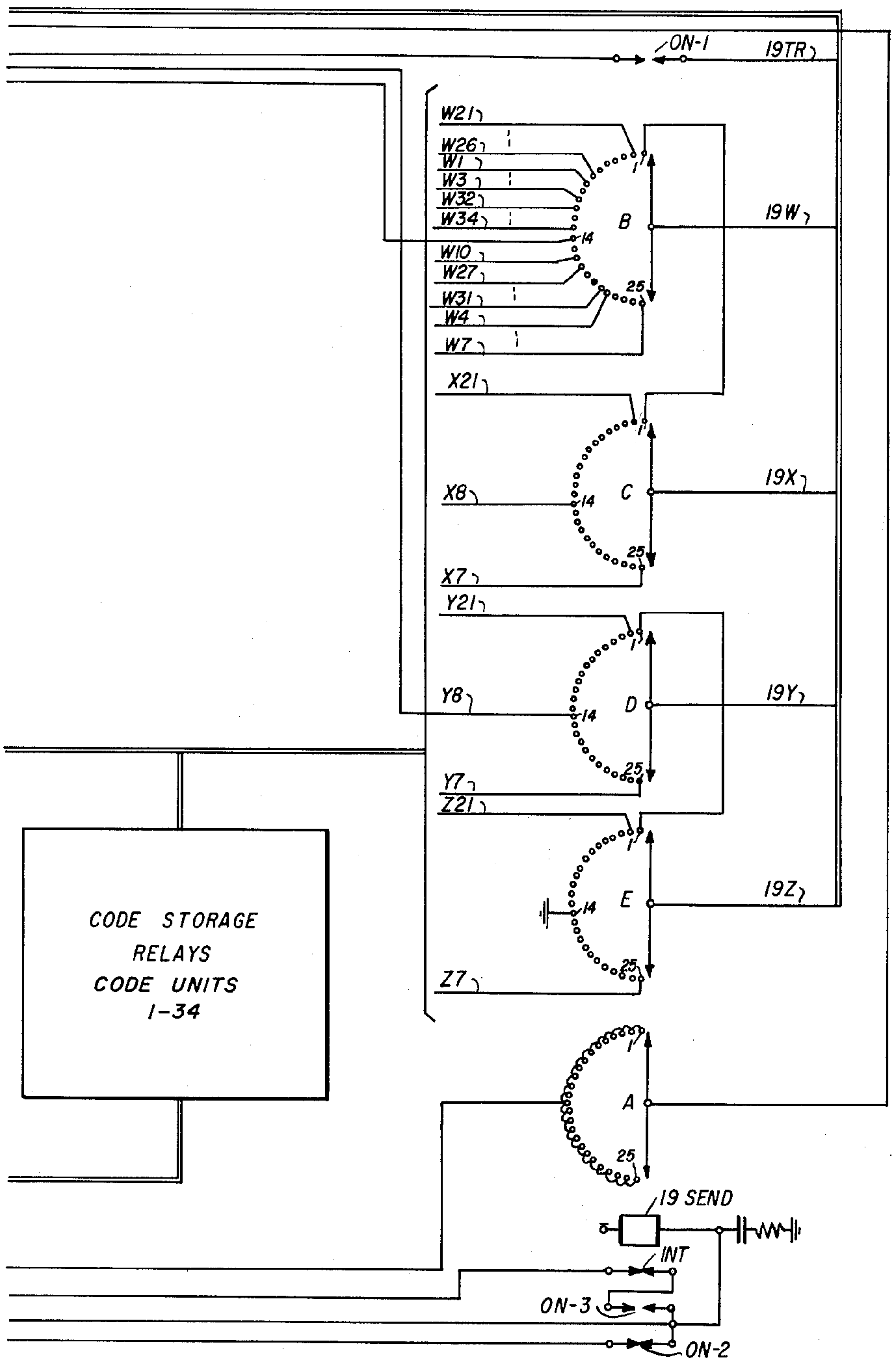

The present invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

In prior automatic toll ticketing telephone networks of the type disclosed in the Ostline, Coleman and Taugner patent application, Serial No. 628,474, now U.S. Patent 3,019,295, granted January 30, 1962, toll ticketing telephone connections are established under the control of common equipment accessed by a code dialed into the local switch train by the calling subscriber. The common equipment usually includes a toll ticket repeater, a calling line directory number detector, a translator-sender circuit to insure that the digits are properly dialed into the succeeding exchange and a tabulator with its associated daters and ticket perforators to compile the data relating to the call and make a record of it. This type of ticketing equipment has met with great success. In the improved toll ticketing system described herein, to further increase the economies and versatilities offered by systems of this general type, the previously enjoyed advantages of toll ticketing have been extended to exchanges in a network utilizing the present standard toll access number "112." This is performed by using an arrangement in the ticketer whereby the party identity is detected during the dialing of the called party number. This improved type ticketer, installed in an office, is used for the processing of subscriber dialed toll calls from that office as well as from stations served by the branch offices. This ticketer eliminates the need for the dialing of a special party identity digit following the toll access code.

Full automatic identification of calling station numbers in both main and branch offices and the recording of such numbers in the main exchange are provided.

Automatic toll ticketing apparatus of the type noted above is particularly useful in moderate sized exchanges in the vicinity of 10,000 stations or smaller and in areas where there are a number of urban centers of comparable size. Occasionally, due to light toll traffic from certain of the exchanges in a network, it may be uneconomical to install even the simplified equipment required for a branch exchange to permit a central exchange to automatically ticket all calls therefrom. Under such conditions it is still desirable to have direct dialing between the exchanges of the network and of course the inherent economies of the automatic ticketing operation from the main office and these branch offices that warrant such service. To provide the automatic ticketing functions and still permit the direct dialing between all exchanges of a network required the central ticketing equipment to accept calls from exchanges with the simplified equipment and those not having any type of toll ticketing equipment.

Accordingly, it is the main object of the present invention to provide an improved automatic toll ticketing telephone system for use in telephone networks including party lines wherein no special party identity digit need be dialed by the calling subscriber.

It is an ancillary object of the invention to provide new and improved circuits and apparatus for accomplishing the above ticketing operations.

It is a feature of this invention to provide in a telephone system improved toll ticketing repeaters which are directly controllable by calling subscriber dials to register the items of record information pertinent to each toll ticketing connection, record this information as it is transmitted to the ticket repeaters by the calling subscribers and to determine and register the identity of the calling party on a party line while the called party number is being dialed.

Another feature of this invention is the circuitry of the ticketer whereby various length called numbers are accepted for registry in the ticketer.

Another feature of this invention is the circuitry for detecting a foreign area code if it should inadvertently be dialed twice.

Still another feature of this invention is the circuit arrangement whereby the first dialed digit is stored simultaneously with its dialing and is resent to the transender while the remaining digits of the called number are dialed.

Further objects and features of the present invention pertain to the particular arrangement of the various circuit elements of the automatic toll ticketing telephone system, whereby the above objects and additional operating features are attained.

Figure 20:
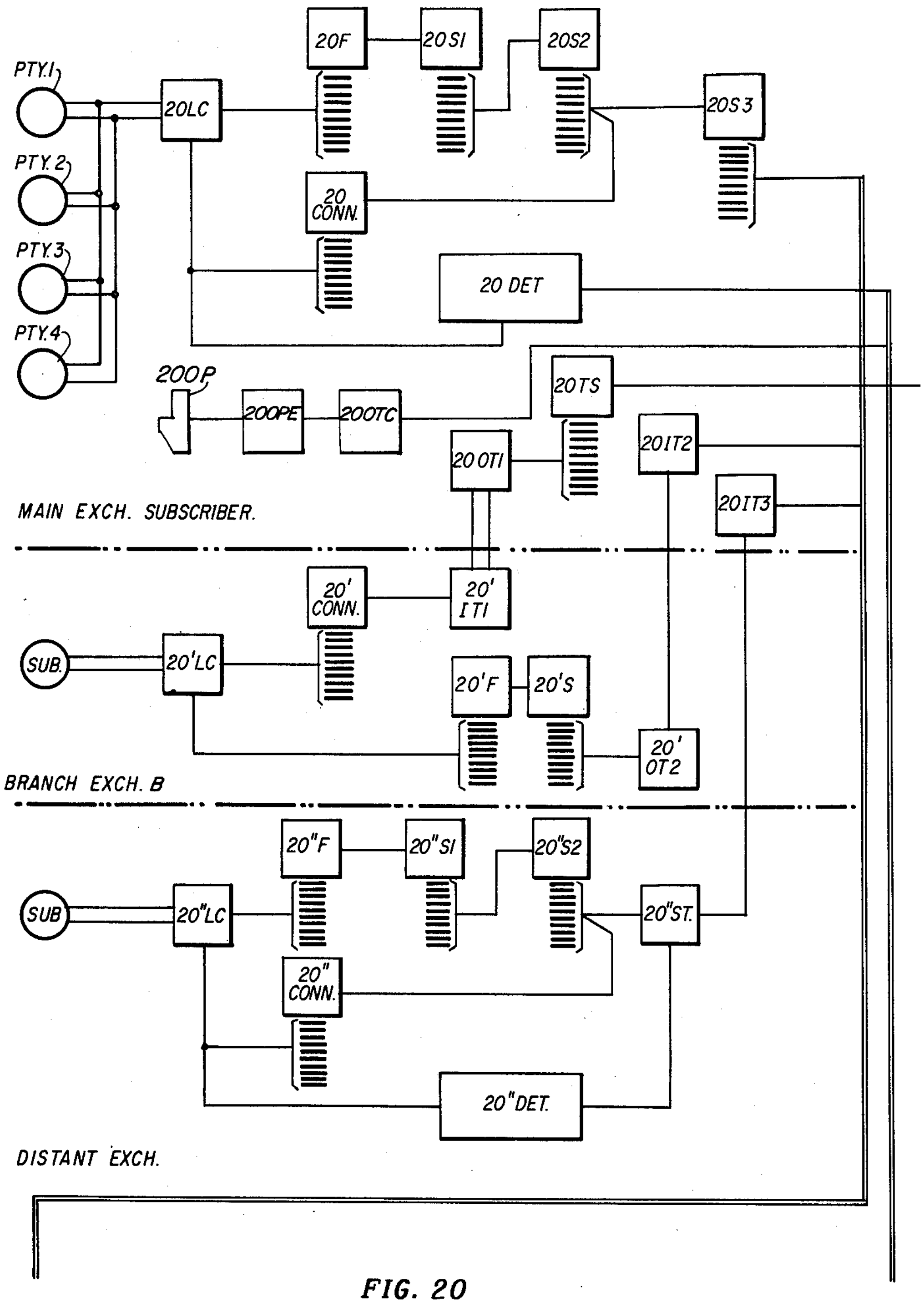

The invention, both as to its organization and method of operation, together with further objects and advantages thereof will best be understood by reference to the following specification taken in connection with the accompanying drawings, in which FIGS. 1 to 19, inclusive, illustrate in schematic form the details of a ticketer in the main exchange. FIG. 20 illustrates in block diagram form the apparatus incorporated in the exchange and also a branch exchange B of a toll ticketing telephone system. FIGURE 20 illustrates in block diagram form the toll ticketing equipment associated with the ticketer during the various phases of its operation.

FIGS. 1 to 19, inclusive, illustrate in schematic form the details of the ticketer. This circuit is seized from a selector on locally originated calls, from an incoming trunk circuit on calls originating in a branch having subscriber directory number-detecting equipment such as exchange "B."

In this type of system, it is necessary to dial an access code to seize this circuit.

The principal functions of the Ticketer are as follows:

(1) FUNCTION COMMON TO ALL CALLS (*a*) It calls for a Transender when seized.

(*b*) It repeats to the Transender the office code digits on seven or eight digit calls or the area code plus the office code digits (if needed) on ten or eleven digit calls.

(*c*) It absorbs those digits of the called number which are not required for sending.

(*d*) It provides for stop-dial and flashing signal supervision.

(*e*) After an adjustable "grace" period, it times the length of conversation from the time the called party answers until the calling party disconnects.

(*f*) It stores the following ticketing information during conversation: the calling number 7 (digits); the called number (7, 8, 10, or 11 digits); and a change in toll rates indication, if it occurs during the call.

(*g*) After the calling party has disconnected, it calls for a Tabulator and transfers to it the ticketing information. During this transfer operation, the Ticketer is guarded against seizure from another call, but the calling line and the outgoing trunk are released. The Ticketer releases after transfer is completed.

(*h*) If the call is not answered, the Ticketer releases when the calling party disconnects and no ticketing information is recorded for the call.

(*i*) It provides special markings to the Transender when unstandard conditions are encountered.

(*j*) It provides visual supervision of the progress of a call through the Ticketer by means of the supy lamp.

(2) FUNCTIONS OF THE TICKETER PERTAINING TO LOCAL ACCESS CALLS (*a*) It tests for a low-resistance ground leak on the calling line.

(*b*) It determines the party identity and calls for a detection of the calling party's number.

(*c*) It stores the first dialed digit while hunting for a transender and after seizing a transender resends the first digit simultaneously with the repeating of the second and third digits to the transender (see section titled "Dialing the Office Code Digit 'A' ").

(*d*) It provides for extending the call to a "D" operator should an incomplete detection occur.

(3) FUNCTIONS OF THE TICKETER PERTAINING TO REMOTE ACCESS CALLS (TYPE "B" SERVICE)

(*a*) It receives the calling party's number which has been detected in the branch office.

(*b*) It provides for extending the call to a "D" operator should an incomplete detection occur.

(4) FUNCTIONS OF THE TICKETER PERTAINING TO REMOTE ACCESS CALLS (TYPE "D" SERVICE)

(*a*) It provides for extending the call to a "D" operator when the calling party has completed dialing the called number.

FIG. 20 of the drawing discloses in schematic block diagram form the switching equipment of the main exchange a subscriber line, a detector allotter, a detector, a trunk circuit incoming from a branch exchange to the main exchange ticketer, a ticketer selector for accessing outgoing trunks, an operator position and a branch exchange "B" including an outgoing trunk circuit and detector.

*The trunk circuit 20IT2 incoming from a branch exchange to a main exchange ticketer, through an associated ticketer hunter.*—This circuit is designed to provide incoming service from an outgoing trunk circuit in a branch exchange, to a ticketer. When seized, the incoming trunk circuit causes its associated ticketer hunter to hunt for an idle ticketer. The incoming trunk circuit receives the detected calling party's number from the branch office over the "+" side of the line and forwards this information ot the ticketer. This circuit's functions are:

(1) To be seized over the "—" side of the trunk.

(2) To stop hunting if the subscriber dials prematurely.

(3) To stop the ticketer hunter if a ticketer is simultaneously seized by more than one ticketer hunter or selector.

(4) To convert incoming dial pulses on the "—" side of the trunk to outgoing loop pulses to the ticketer, an operator's position board 200P including a keysender and operator's position equipment circuit 200PE. The functions of the circuit are:

(1) To connect a Ticketer Circuit to an individual operator via the Operator's Trunk Circuit to provide service to the Ticketer.

(2) Provides a Wait Lamp to signal a call, a Pilot lamp to mark the processing of the call by the operator, and an Accept Key for the operator to accept the call. These are face equipment.

(3) Provides a common allotter to prevent the same ticketer from being simultaneously seized by two or more operators.

(4) Extends the talking leads from the ticketer to the operators headset, and the control leads to the position keyset.

*An operator's trunk circuit 200TC.*—The functions of this circuit are:

(1) To provide operator service.

(2) To find the Ticketer requesting operator service from a group of ticketers.

(3) Seizes ticketers which request operator service.

(4) Connects operator to Ticketer and provides pilot lamp to supervise operator keying operations.

(5) Provides signal tone when seized by operator.

(6) Extends operator's keyset to Ticketer and repeats keyset operations to Ticketer.

(7) Automatically releases when operator's Start key is operated.

*The outgoing toll trunk circuit 20"ST from exchange B to the main exchange.*—This circuit is designed to provide outgoing service from a branch exchange having a detector, to a main exchange equipped with toll ticketing equipment. This circuit's functions are:

(1) Provides transmission battery to calling station.

(2) Repeats dial pulses over "—" side of trunk to the distant ticketer.

(3) Registers spotter pulses while called party digits are dialed;

(4) Initiates a terminal detection.

(5) Registers party identity and pulses this information over "+" side of the trunk to the distant office.

(6) Switches the talking circuit through the repeat coil transmission bridge connecting the calling station to the trunk.

Figures 21, 22:
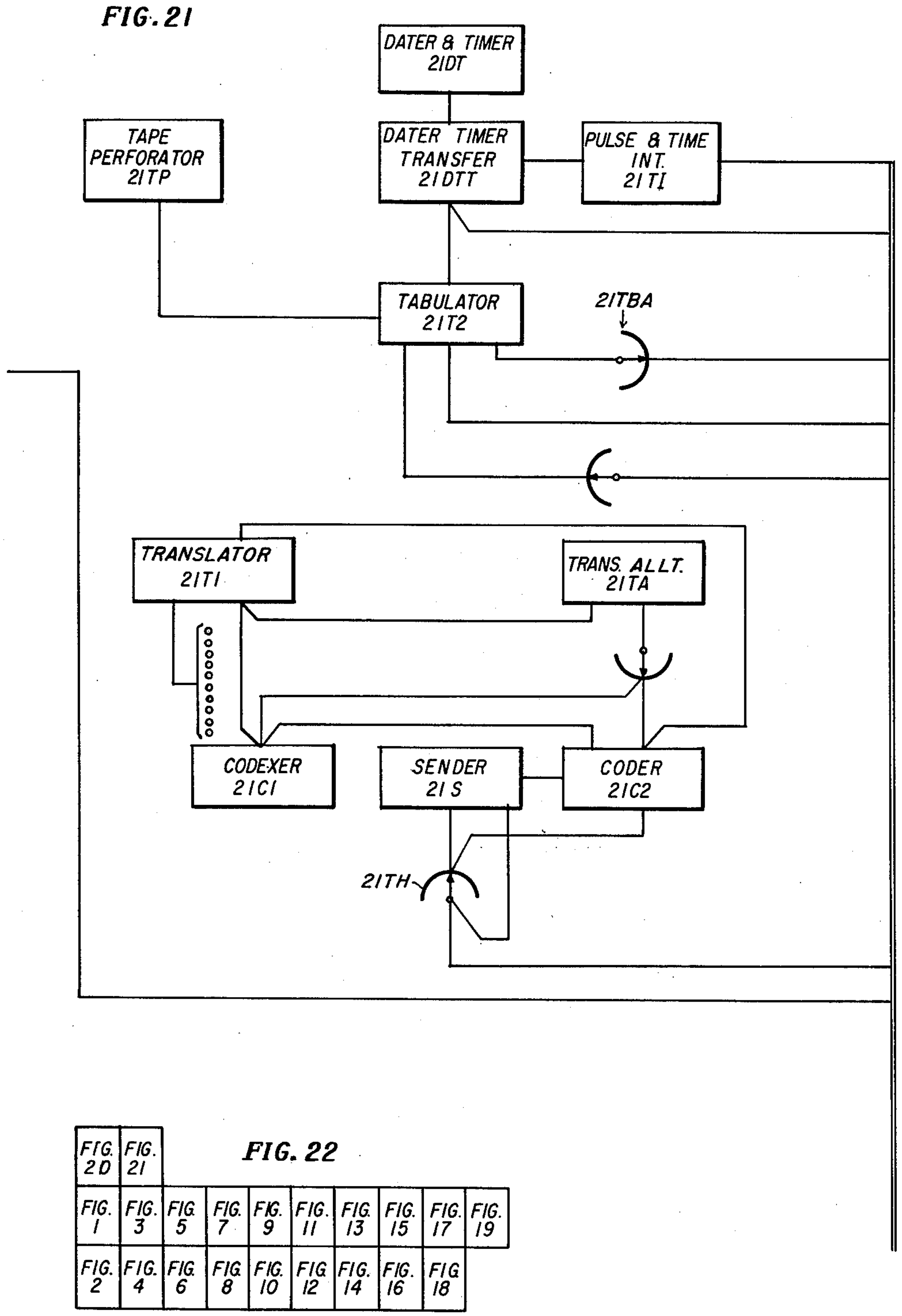

FIG. 21 illustrates in schematic block diagram form the transender and tabulator equipment. The transender equipment consists of a transender hunter 21TH, transender coder 21C2, transender sender 21S, transender codexer 21C1 and the associated translator 21T1 and translator allotter 21TA. The tabulator equipment consists of a tabulator allotter 21TBA, a tabulator circuit 21T2, a dater and timer circuit 21DT, a pulse and time interrupter 21T1 and a tape perforator 21TP.

The transender hunter circuit 21TH is associated with a ticketer and its function is to find or hunt for an idle transender.

The transender coder 21C2 is an integral part of the transender and as such operates in direct conjunction with the transender codexer 21C1 and transender sender 21S.

One transender from a common pool is associated with a ticketer while the subscriber dials the called number. It is retained under control of the ticketer until it obtains a routing directive either from the common translator or from the built-in directive in its coder and until it completes the required sending. Upon completion of sending, the ticketer switches through and frees the transender for use on other calls. The functions of the coder are:

(1) When it receives a "skip" control directive and a routing directive from the translator through a bar relay to store them on codel relays.

(2) To route calls to an operator or release the transender and provide busy tone if the translation is of a non-standard nature.

When the coder is used on calls requiring routing directives from the translator, all codel leads and other leads are extended for a brief period to the translator. At the same time, a relay is operated in the translator as determined by the office code and area code dialed by the subscriber. The relay momentarily grounds some of these leads and operates the corresponding relays of the coder extended to it. The operated codel relays in turn place ground in codel leads and thereby make the routing directive available to the transender-sender. Most routing directives consist of fewer digits than the six provided during the interdigital interval following the sending of the preceding routing digit, and upon encountering the first empty codel will cause the coder out sequence switch to "skip" over the remaining codels of the routing digit storage.

The major function of the sender is to control the sending of impulses from the transender. The sending operation is started as soon as the coder has received the routing directive, or the coder may await a signal from the ticketer before starting the sender.

Pulses are generated by a small constant speed motor (48 v. D.C.) to control the sender pulse relay to provide pulses at a uniform speed and pulse ratio. Pulses sent by this circuit are determined by information stored in the coder and ticketer. Pulses are sent over a lead (sender control digit) and over the loop to the ticketer selector (or equivalent switches). An adjustable interdigital pause is provided.

Stop dial supervision can be received during the interdigital period. Upon receipt of a stop signal, the sender extends the interdigital counting interval by 2.2 seconds so that slow flashing busy signals (30 i.p.m.) can be differentiated from momentary stop dial signals. The outgoing trunk and the transender are automatically released when a flash busy is recognized. A stop signal can also be recognized for flash counting purpose during the outpulsing of a digit, but pulsing will not be interrupted unless a flash is recognized before the digit is complete.

The transender codexers main functions are:

(1) To receive subscriber dial pulses, inverted and repeated to the transender by a ticketer.

(2) To register the three-digit office or foreign area code on an 800 point Strowger switch to select a code lead extending into the common translator. The selected code lead is marked, and the single code indication is forwarded under control of the translator assigner.

(3) To recognize specific foreign area code requiring dual translation, in which case the area code is stored on rotary switches and the Strowger switch is released and repositioned on the three-digit office code. The original area code is forwarded via one of five leads and the selected office code lead is marked under control of the translator assigner.

(4) To provide facilities to identify up to five foreign area codes for dual translation.

(5) To provide homing circuits for rotary switches and a release magnet for the Strowger switch with release failure alarm under control of the associated sender unit of the transender.

The translator is a group of relays which is used in conjunction with the transenders for the purpose of supplying the transenders with the necessary routing directive as determined by the first three or six digits registered in the transender on its codexer. The translator is common to the transenders; it is seized only momentarily when a routing directive is required. The connection of the transender to the translator is controlled by the translator assigner. The transender and translator are described in greater detail in the Ostline, Coleman and Taugner application Serial No. 628,474, filed December 3, 1956, now U.S. Patent 3,019,295, granted January 30, 1962.

The tabulator circuit's function is to forward toll call ticketing data to tape perforators. The toll call ticketing data consists of information received from the ticketer, the dater-timer, the radexer (if provided), and from the tabulator itself.

The information received from the ticketers consists of the ticketer identity number (three digits), conversation time (three digits), called number (seven, ten or eleven digits), calling number (five digits), and a possible change in rates during call conversation timing indication. The information received from the dater-timer consists of the calender date (day and month), the time of day and a day or night rate indication. The dater-timer is directly connected to the tabulator via a dater-timer transfer circuit. If a radexer is provided, it supplies a two digit call rate determined by the ABC office code of the called number. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data received from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators. The tabulator is described in greater detail in the Ostline application Serial No. 625,773, filed December 3, 1956, now U.S. Patent 2,981,-798, granted April 25, 1961.

FIG. 22 illustrates the manner of combining FIGS. 1 to 21 inclusive of the drawings to form a unified system.

*Detailed Operation*

SEIZURE FROM LOCAL SELECTOR ACCESS CALLS

When the calling subscriber at station 20PTY2 removes his receiver, the usual loop circuit, including the line conductors is completed for operating the line circuit 20LC. In response to the completion of the above mentioned loop circuit, the line circuit 20LC initiates operation of the distributor and marks the terminals of the calling subscriber line in the bank contacts of a group of line finders, including the line finder 20F, having access to the calling subscriber line. For the purpose of this description it will be assumed that the distributor selects the line finder 20F and that the latter finder operates its wiper in a vertical and then in a rotary direction in the well-known manner to select the terminals in the associated bank terminating to the calling line. When the calling line is found by the line finder 20F, it extends the calling line to the individually associated first selector 20S1 and the latter selector transmits the usual dial tone signal to the calling subscriber to indicate that the dialing may be started. The above noted switching apparatus, including the line circuit 20LC, the distributor, the line finder 20F and the first selector 20S1 may be of conventional construction and arrangement and may be, for example, of the type illustrated in the Bakker Patent No. 2,289,896, granted July 14, 1942 and in the Saunders Patent No. 1,849,694, granted March 15, 1932.

Since the calling subscriber at station 20PTY2 intends to extend the connection to a called subscriber in a remote exchange it is necessary to prefix the director number of the called subscriber with the access code digits "112". Consequently, when the calling subscriber received the dialing tone signal the dial is actuated in accordance with the digit to transmit one loop impulse to the first selector 20S1. This selector then raises its wipers in a vertical direction to the first level and then rotates its wipers over this selected level to search for a succeeding selector 20S2 and through 20S2 and 20S3 in the same manner to an idle ticketer, such as the ticketer of FIGS. 1–19. It will be assumed for the purpose of this description that the selectors now extend the connection from the calling subscriber line by way of the cable to the ticketer illustrated in FIGS. 1 to 19, inclusive. The cable includes the "−" conductors 2TL, the "+" conductor 1RL and the control conductor 2CL. If the ticketer is busy, the control conductor will be grounded in order to indicate the busy condition to the selectors. Thus, as the selector rotates its wipers over the level it will pass over contacts terminating ticketers having grounded control conductors corresponding to the 2CL conductor.

*Local Access Calls for Automatic Number Identification Service*

SEIZURE FROM LOCAL SELECTOR

Battery potential through resistor 6R7 contacts 6BS1, 6BA2, 5EN7, 4BC1 on lead 2CL marks this switch idle to preceding selectors. When seized, the "tip" side of the subscriber's loop is closed, via lead 2TL, through contacts 4DC4, 5EN11, 5HD12 the number one and number two windings of polar relay 9PA and lamp 9L to exchange battery; and the "ring" side of the loop is closed, via lead 1RL, contacts 4DC2, 5EN10 through the number one winding of relay 7AA and resistor 5R6 to spotter battery. Relay 9PA does not operate at this time. Relay 7AA operates from the spotter battery and closes at contacts 7AA2 a circuit to ground from contacts 5EN4 for relay 5AB. Relay 5AB operates, closes a circuit to the number two winding of relay 6BA at contacts 5AB3 and a circuit to relay 6BS at contacts 5AB1 and also grounds lead 5TCA at contacts 5AB2 from ground at contacts 4BB1. Relay 6BA from contacts 3LP2, 1KD3, 6BA1, operates, replaces resistance battery with ground on leads 2CL, to mark this circuit busy to searching equipment and to hold the preceding equipment, ground potential is also extended from contacts 6BA5 via resistor 9R23 to the number 3 winding of relay 9PA to hold this polar relay in an unoperated state, and completes circuits to relays 4BB and 10BN at contacts 6BA5 and 6BA7 respectively. Relay 10BN operates, closes ground from contacts 10BN10 through relay 12SF, contacts 12SF1 to lead 12G and through contacts 12SH13, 10BN9, 10FC14 to lead 10M of the Transender Hunter Circuit. Relay 4BB operates, closes a multiple ground at contacts 4BB2 to relay 6BS and relay 9H, at contacts 4BB9 grounds lead 2HU to provide an additional busy mark to the preceding equipment, at contacts 4BB1 and 4BB11 respectively removes ground from leads 5TCA and 4ATB (to provide a possible All-Ticketers-Busy indication), at contacts 4BB3 shunts relay 4BE, and at contacts 4BB13 closes the supy lamp 4SL to lead 2SL. Relay 6BS operates, closes the circuit of relay 3SR at contacts 6BS4 to the Incoming Trunk Circuit via contacts 6AN4 and lead 2UH1, prepares a locking ground for the codels at contacts 6BS5 via lead 14LGC, and at contacts 6BS6 closes direct ground from contacts 6BS6 to the supy lamp 4SL and lead 2SL. The supy lamp 4SL lights brightly to indicate that the Ticketer has been seized. Relay 9H operates.

If the associated Transender is busy, ground appears on lead 12G, of the storage unit, thus short circuiting relay 12SF and causing the Transeneder Hunter to search for an idle Transender. When an idle Transender is found absence of ground appears on lead 12G. Relay 12SF operates in series with the rotary switch magnet in the Transender Hunter via lead 10M, closes ground at contacts 12SF8 to lead 12G to mark the associated Transender busy, replaces resistance 12R9 ground with direct ground at contracts 12SF4 for holding the codels storage relays, and closes a circuit to the number one winding of relay 12SH at contacts 12SF7 through 10BN8, 10FC12 and 5EN14. Relay 12SH operates, closes at contacts 12SH12 a locking path for relay 12SF to the Transender via lead 12HT, closes leads 12SR and 12ST to leads 5R and 5T respectively, to switch the Transender through to the Ticketer, and operates its contacts 12SH13 last to open lead 10M.

TWO OR FOUR PARTY IDENTIFICATION

With two or four party identification, no digit need be dialed into the ticketer for identification purposes. This permits the ticketer access codes to be followed immediately by the called party's number. The Transender is found while the first digit of the called number is being dialed. The second and subsequent digits are stored in the ticketer, which pulses them to the Transender. During this period the ticketer transmits the first dialed digit information to the Transender for setting up a translation.

FOUR PARTY IDENTIFICATION

In four-party identification with standard dials, party number one employs a standard subset while party number 2 provides a tip mark through dial shunt springs during dialing.

If the calling party is the number two party resistance ground is closed to relay 9PA during the line breaks of the first digit. This resistance ground is placed on the "tip" side of the line and, as such, causes the number 1 and number 2 windings of relay 9PA to operate in series and overcome the number 3 windings, which is biased into non-operate condition. Relay 9PA operates on the first line break and closes a circuit to relay 14PB. Relay 14PB operates, locks through its "X" contacts 14PB2, opens its original operating path at contact 14PB3, further opens lead PB1, and prepares a path to lead P2. Relay 9PA continues to operate on the line break but has no effect on the circuit.

If this is party number1, no resistance ground is present on the "tip" side of the line and neither relay 14PB nor 14PC will operate and ground will be closed to lead 14PO when relay 4KB operates to indicate that party number one is being identified.

Party number three employs a special Type "B" SATT dial that sends out a ground pulse at the end of the first digit when relay 7AA is operated. For a detailed disclosure of this dial see Patent No. 2,822,424 issued to J. E. Ostline on February 4, 1958. Relay 9PA operates from this ground pulse and closes the circuit to relay 14PC. Relay 14PC operates, locks through its "X" contacts 14PC4, opens its original operating path, prepares a path to relay 14PB, and prepares to close ground potential to lead 14P3 and contact 14BR34. Relay 14PB cannot operate on this identification marking since 7G will operate during the interdigital pause and open 14PB's operating path.

Party number four also employs a special Type "B" SATT dial of the type disclosed in Patent No. 2,822,424, but sends out a ground mark over the "tip" side during the "next to last" line break which remains on the line when the line loop is closed. Relay 9PA operates when the ground mark is present during the line break and closes a circuit to relay 14PB. Relay 14PB operates, locks through its "X" contacts 14PB2, opens its original operating path, and prepares a circuit to lead 14P2. Relay 9PA remains operated from the ground mark during the closed period on the line loop and closes a circuit to relay 14PC. Relay 14PC operates, locks through its "X" contacts 14PC4, opens its original path, and transfers the preparatory circuit from lead 14P2 to lead 14P4.

The arrangement, therefore, assumes that either the first or second digit dialed into the ticketer will be "2" or greater for proper identification.

INITIATING DETECTION CYCLE (Operated: Relays 7AA, 5AB, 6BA, 10BN, 4BB, 6BS, 9H, 12SF, 12SH, 7HA, 7G, 9HB, 5HD, 2KA, and possibly 14PC and/or 14PB).

Ordinarily, the detection cycle is so rapid it will occur during the interdigital pause between digits. Ground on lead start 2ST and absence of ground on lead guard 2GD indicated to the detector assigner that a detection of a calling number is deisred by a ticketer. When the detector assigner steps to the calling ticketer, relays 4KB's circuit is closed over lead hold in series with a relay in the detector assigner. Relay 4KB operates, closes ground to lead 2PCA for peg count metering, completes the circuit for relay 1KD to lead 14GC, closes a circuit to bar relay 14BR, and closes ground to either lead 14PO, 14P2, 14P3, or 14P4 depending on whether or not 14PB and/or 14PC is operated. Bar relay 14BR operates, closes leads 14W1 to 14Z7, 14EB, and 14PO to the detector, and to the detector assigner leads 14INC and 14GC, respectively. Ground on lead 14GC is closed to relay 1KD. Relay 1KD operates and replaces ground with +DB detector battery on the control leads 2CL. During the detection cycle, the detector assigner may momentarily remove ground from lead 14GC causing 1KD to pulse and momentarily remove the +DB detector battery from the control lead.

In the course of the detection cycle, the detector closes ground to the various 14W1 through 14Z7 leads. These grounds represent, in code, the office code and terminal number of the calling station. Various code relays in the groups marked codels 1 through 7 operate from these grounds and lock to store the calling number. The decimal equivalents of the W, X, Y, and Z code relays are described in a subsequent section.

When the detection is complete, the detector closes ground via lead 14EB to relay 1KC. Relay 1KC operates, locks, closes battery through the magnet of switch 16OS to lead 12SC of the transender, and opens the circuits of relays 2KA and 4KB. Relay 2KA restores, removes ground from start lead 2ST and closes guard lead 2GD to release the detector. Relay 4KB restores, removes ground from lead 2PCA, and opens the circuit of relay 1KD and bar relay 14BR. Bar relay 14BR restores. Relay 1KD restores and replaces +DB detector battery with ground on lead 2CL. Resistor 1R11 is used in conjunction with the "X" makes on relay 1KD to facilitate application of detector battery to the "C" lead without dropping the switch train and without burning contacts when ground is connected to the positive detector battery.

DIALING THE OFFICE CODE DIGIT "A"

(Operated: Relays 7AA, 5AB, 6BA, 10BN, 4BB, 6BS, 12SF, and 12SH).

Relay 7AA follows the dial pulses of digit "A" and, when at normal, opens the circuit of relay 5AB, closes the circuit to relay 5AB, closes the circuit to relay 12CA and the number two winding of relay 9S, and closes a circuit to switch 18PS. Relay 12CA operates and closes the circuit to relay 11CB. Switch 18PS operates. Switch 18PS shown on FIG. 18 functions to store the first dialed digit on its banks for later resending it to the Transender. Relay 9S operates and prepares a circuit to the number two winding of relay 9T. Relay 11CB operates, closes ground to the number one and number two windings of relay 7G, closes a holding circuit to relay 9S via the number two winding of relay 9T, short circuits the number two winding of relay 9T, and closes ground to switch 16SS Relay 7G does not operate at this time since its windings are connected in magnetic opposition.

Switch 16SS operates. Relays 5AB, 12CA, and 11CB remain operated during pulsing due to their slow-to-release characteristics.

At the end of the first pulse, relay 7AA reoperates, closes a circuit to relay 5AB, opens the circuit to relay 12CA and switch 18PS, and removes the short circuit from the number two winding of relay 9T. Relay 9T operates in series with the second winding of relay 9S and transfers the pulsing circuit to switch 15DS via the number one winding of relay 9T.

Switch 18PS restores and advances its wipers to bank contact number 1. Switch 18PS continues to follow the pulses of the first digit to store this digit and pass it to the Transender when required. Relays 9S and 9T and switch 15DS step after every second pulse.

When relay 7AA restores on the second dial pulse, ground is closed to switch 15DS. Switch 15DS operates and opens its springs INT–1, opening the circuit to relay 9S and the number two winding of relay 9T. Relay 9S restores but relay 9T remains operated on its number one winding for the duration of the pulse.

At the end of the second pulse, relay 7AA reoperates and opens the number one winding of relay 9T and switch 15DS. Switch 15DS restores and steps its wipers to bank contact number two. Relay 9T restores and transfers the pulsing circuit to relay 9S. This same sequency of operation for relays 9S and 9T and switch 15DS is repeated for the remaining dial pulses and switch 15DS advances its wipers following the second, fourth, sixth, eighth, and tenth dial pulses of the digit.

Relay 7AA continues to follow the pulses and repeats them to switches 18PS and 15DS. Following completion of the digit, relay 7AA reoperates, recloses a circuit to relay 5AB, and opens the circuit to relay 12CA and switch 18PS. Switch 18PS restores and advances its wipers to the bank contact corresponding to the digit dialed. After its slow-to-release interval, relay 12CA restores, opens the circuit of relay 11CB, and closes ground to wipers C and E or D and F of switch 18PS (depending on whether or not relay 9T is operated) to store the first digit of the called number in CODEL 21. After its slow-to-release interval, relay 11CB restores, opens the first and second windings of relay 7G, opens the circuits of relays 9T and 9S (if operated) closes a homing circuit to switch 15DS, and opens the circuit to switch 16SS. The opening of the first and second windings of relay 7G causes an inductive kick to be produced. Relay 7G operates its "X" contacts 7G1, operates completely with both windings in series, closes ground to lead 12FT to initiate pulsing of the first digit into the Transender Codexer, and transfers the pulsing circuit from switch 18PS to the Transender via lead 12WP. Switch 15DS steps self-interruptedly to one of its "home" positions. Switch 16SS restores, advances its wipers to bank contact number two and closes a circuit to the first winding of relay 13ON. Relay 13ON operates and locks.

This circuit is arranged to repeat the first digit, marked on the digit equivalent bank terminal of switch 18PS, to the Transender during the receiving of the second and up to the completion of the third digit. Ground on lead 12FT causes a rotary switch in the Codexer to operate and return ground via lead 12RV. Ground via lead 12RV is closed to switch 18PS which operates its INT2 springs and interrupts the ground to lead 12FT to step the Codexer switch. The Codexer switch advances and interrupts ground on lead 12RV causing switch 18PS to step to the next bank contact. This interrupted action continues until switch 18PS returns to normal, reoperates its ON springs, and removes ground from lead 12FT. Thus the first digit is received by the Transender in revertive form.

DIALING THE OFFICE CODE DIGIT "B"

Relay 7AA follows the dial pulses of digit "B" and repeats them over lead 12WP to the Transender. As relay 7AA restores on the first pulse, it opens the circuit of relay 5AB and closes a circuit to relay 12CA and the second winding of relay 9S. Relay 12CA operates and closes a circuit to relay 11CB. Relay 9S operates and prepares a circuit to the second winding of relay 9T. Relay 11CB operates, closes a holding circuit to relay 9S via the second winding of relay 9T, short circuits the second winding of relay 9T, and closes ground to switch 16SS. Switch 16SS operates. Relays 5AB, 12CA, and 11CB remain operated during pulsing due to their slow-to-release characteristics.

The cycle of operation for relays 9S and 9T and switch 15DS is the same as described in the preceding section.

At the completion of the digits, relay 7AA reoperates, closes a circuit to relay 5AB, opens the circuit to relay 12CA, and removes ground from lead 12WP to register the second digit in the Transender. After its slow-to-release interval, relay 12CA restores, opens the circuit to relay 11CB, closes the circuit to relay 7HA, and closes ground to wipers C and E or D and F of switch 15DS (depending on whether or not relay 9T is operated) to store the second digit in CODEL 22. Relay 7HA operates, locks via the second winding 9HB, short circuits the second winding 9HB, and closes ground to the Ticketer Selector via lead 7PD. After its slow-to-release interval relay 11CB restores, removes the short circuit from the second winding of relay 9HB, opens the circuit of relay 9T and relay 9S (if operated), closes a homing circuit to switch 15DS, and opens the circuit of switch 16SS. Relay 9HB operates in series with relay 7HA and closes a circuit to relay 5HD. Switch 16SS restores, advances its wipers to bank contact number 3, and closes the circuit of relay 9H via contacts 6BA3, 12CA7, bank contact number three on level B of switch 16SS, the ON1 springs of switch 18PS (after switch 18PS sends the first digit to the Transender), 11CB1, 7G3 and 9H2. Switch 15DS steps self-interruptedly to one of its "home" positions. Relay 5HD operates momentarily, closes the second winding of relay 7AA to hold relay 7AA operated while transferring the "ring" side of the line (lead 1RL) from SPOTTER BATTERY to exchange battery via resistor 5R5 and the "tip" side of the line (lead 2TL) from polar relay 9PA to ground. Relay 9H operates, locks, opens its original operating circuit, and opens lead 12FT to the Transender.

DIALING THE OFFICE CODE DIGIT "C"

Digit "C" is stored on codel relay storage group 23 in the same manner as described in an earlier section.

After the first digit is sent to the Transender, ground is closed to relay 2KA at the end of either the second or third digit, contacts 4BB3, level E bank contact N of switch 18PS, 7HA8, 10FC6, 4BB7, 5HD9, 10BN6, 7HC2, 1KC2, 5GT1, 9H5, 7HA4, 3KE5. Relay 2KA operates, closes lead 1 HOLD to relay 4KB, closes ground to lead start 2ST to initiate the detector Assigner, and removes ground from lead guard 2GD to cause the Detector to stop on this circuit. Detection takes place as described in the Section preceding the sections on dialing.

DIALING THE TERMINAL DIGITS

Relay 7AA follows the dial pulses of the terminal digits. The cycle of operation for relays 12CA, 11CB, 9S and 9T and switches 15DS and 16SS is the same as described in the preceding sections. The first, second, third and fourth terminal digits are stored on codel storage relay groups 27, 28, 29, and 30, respectively.

After the seventh digit (fourth terminal digit) is dialed, switch 16SS steps to bank contact N. If there is another digit, it is stored on codel relay storage group 31 and switch 16SS steps to bank contact number 1, closing the circuit to relay 10TE. Relay 10TE operates, opens the operating paths to relays 12CA, 9S and 9T and switch 15DS to prevent receiving of further pulses.

DIALING THE CALLED NUMBER-LONG HAUL TOLL CALLS (Operated: Relays 7AA, 5AB, 6BA, 10BN, 4BB, 6BS, 12SF, 12SH and possibly 9H, 7HA, 9HB, 7G, 2KA, 5HD, 1KC, and 14PB and/or 14PC)

On a long haul toll call, the first three digits constitute the area code of which the second digit is always 1 or 0; the second three digits constitute the ABC office code; and the last three, four, or five digits constitute the terminal digits.

DIALING THE FIRST DIGIT OF THE AREA CODE

Relay 7AA follows the dial pulses of the first digit and repeats them to switch 18PS. See preceding sections for a detailed explanation of these operations.

After dialing is completed, the codel relays in CODEL 21 operate and lock to store the first digit of the area code. Switch 16SS steps to bank contact number 2 and closes a circuit to the first winding of relay 30N. Switch 15DS "homes" Relay 13ON operates and locks.

DIALING THE SECOND DIGIT OF THE AREA CODE

Relay 7AA follows the dial pulses of the second digit of the area code and repeats them over lead 12WP to the Transender. The cycle of operation for relays 12CA, 11CB, 9S and 9T and switches 15DS and 16SS is the same as described earlier. Since the second digit of the area code is 1 or 0, switch 15DS either remains normal or steps five times. In either case, switch 15DS engages bank contact number 1 or number 6 after the last dial pulse.

At the completion of dialing, relay 12CA restores, opens the circuit to relay 11CB, closes the circuit to the codel relays in CODEL 22, and closes ground via 6BA3, 12CA7, level B, bank contact #2 of switch 16SS, 11CB4, wiper B of switch 15DS engaged on bank contact number 1 or number 6 to the first winding of relay 15LH. Relay 15LH operates, locks, closes ground to level B bank contact number 14 of switch 19SEND, and opens the self-interrupted stepping circuit of switch 16SS to bank contacts number 4, number 5, and number 6 on level B to switch 16SS. After its slow-to-release interval, relay 11CB restores and opens switch 16SS. Rotary switch 16SS restores and steps its wipers to bank contact number 3.

DIALING THE THIRD DIGIT OF THE AREA CODE

Relay 7AA follows the dial pulses of the third digit of the area code and repeats them over lead 12WP to the transender. The cycle of operation for relays 12CA, 11CB, 9S and 9T and switches 15DS and 16SS during dialing of this digit is the same as described earlier. After dialing is completed, the codel relays in CODEL 23 operate and lock to store this digit, switch 16SS steps to bank contact number 4, and switch 15DS "homes".

DIALING THE ABC OFFICE CODE AND TERMINAL DIGITS

Relay 7AA follows the dial pulses and repeats them to the Transender over lead 12WP should the Transender require it. The cycle of operation for relays 12CA, 11CB, 9S and 9T and switches 15DS and 16SS during dialing of these digits is the same as described earlier.

The ABC office code and five terminal digits for eleven digit calls are stored in the CODELS as follows:

| | |
|---|---|
| Office code digit A | Codel 24 |
| Office code digit B | Codel 25 |
| Office code digit C | Codel 26 |
| First terminal digit | Codel 27 |
| Second terminal digit | Codel 28 |
| Third terminal digit | Codel 29 |
| Fourth terminal digit | Codel 30 |
| Fifth terminal digit | Codel 31 |

SENDING FROM THE TRANSENDER (Operated: Relays 7AA, 5AB, 6BA, 10BN, 4BB, 6BS, 12SF, 12SH, 9H, 7HA, 9G, 9HB, 5HD, 1KC, various code storage relays, 13ON, and possibly 15LH, 10TE, 11MS, and 14PC and/or 14PB)

SENDING FOR SEVEN OR EIGHT DIGIT CALLS

After the transender has received the ABC office code digits over lead 12WP, and possibly lead 12FT, it starts the cycle of operation whereby the transender is supplied with translated information from the translator. This translated information, which is stored on codels in the transender, is composed of a sending control digit, a translated routing directive, and possibly a hold sending mark. The hold sending mark indicated to the transender to hold sending until the seventh digit of the called number has been registered in the ticketer. If the transender does not receive a hold sending mark from the translator, the sending cycle is as follows:

When the translated information has been received, the transender closes a loop over leads 12SR and 12ST to the ticketer selector, transfer relay, or trunk circuit via leads 5R and 5T and begins transmitting the sending control digit as a series of ground pulses, occuring, at a frequency of ten pulses per second, over lead 12SC to relay 14NS and to magnet 16OS. The sending control digit(s) may consist of one, two, three, or four, five, six, or seven pulses, and its function is to absorb those digits of the called number which are not required for sending. On the first sending control pulse, a circuit is closed to relay 14NS. Relay 14NS operates and, being slow-to-release, remains operated for the duration of the digit. Magnet 16OS follows the pulses and steps its wipers each time it restores.

For purposes of this explanation, assume that the first two digits are not required for sending. Under these conditions, the transender closes three pulses over lead 12SC to relay 14NS and magnet 16OS follows the pulses and steps its wipers to bank terminal contact 4. At the end of the third pulse relay 14NS restores after its slow-to-release interval. Relay 14NS, in restoring, closes ground from 10BN4 through the number two winding of relay 11SM, 11SM1, bank contact 4, level B of switch 16OS, 14NS1, 3ES7, 11SM12, to battery through relay 14NS. Relay 14NS does not operate, in series with the number two winding of relay 11SM. However, relay 11SM operates its "X" contacts 11SM2, locks on its number one winding, operates completely, opens its original operating path, opens the circuit of relay 14NS and magnet 16OS, transfers lead 12WP from the pulsing contacts of relay 7AA to the level C wiper of switch 16OS, and closes leads 12XT, 12YT, and 12ZT to the level D, E, and F wipers of switch 16OS, respectively.

When the transender has completed the sender control digit, it begins sending the translated routing directive which may contain a maximum of six digits. The transender sends the routing directive, and all subsequent digits, in the form of loop pulses via leads 12SR and 12ST, and provides an interdigital pause between each digit. After the transender has finished sending the translated routing directive, it begins sending the decimal equivalents of the code grounds appearing on leads 12WP, 12XT, 12YT, and 12ZT.

If, as assumed earlier, the sending control digit has been 3, the wipers of switch 16OS would be engaged on bank terminals 4 and codel storage unit 23 would be closed to leads 12WP, 12XT, 12YT, and 12ZT. Thus, the first two (AB) digits of the office code have been absorbed and the third (C) digit of the office code will be the first digit of the called number to be sent by the transender.

During the interdigital pause after the digit stored on storage group codel 23 has been sent, the transender closes a ground pulse over lead 12SC to magnet 16OS. Switch 16OS steps to bank terminal 5, and in so doing, closes ground appearing on level A bank terminal 5 to relay 2PS. Relay 2PS operates and opens lead 12SC. The transender must find resistance battery on lead 12SC as a condition for sending. As long as lead 12SC is open, the transender will not send any additional digits.

Ground on level A bank terminals 5, 6 and 7 causes switch 16OS to step, self-interrupted, to bank terminal 8, thus skipping codels 24, 25, and 26 on which no information has been registered. As switch 16OS steps, relay 2PS remains operated from the ground on the bank terminals. After switch 16OS steps to bank terminal 8, relay 2PS restores and closes resistance battery to lead 12SC.

Relay 2PS is now under control of the subscriber's dialing. As long as the subscriber's dialing remains ahead of the sending, relay 2PS will remain unoperated. Should the subscriber hesitate in dialing and switch 16OS catch up to switch 16SS, relay 2PS will operate and prevent any further sending until the subscriber is again one digit ahead of sending.

When resistance battery is closed to lead 12SC, the transender begins sending the digit stored on group codel 27. During the interdigital pause after the digit has been sent, the transender again closes a ground pulse over lead 12SC to magnet 16OS. Switch 16OS steps to bank terminal 9 and closes storage unit codel 28 to leads 12WP, 12XT, 12YT, and 12ZT. The digits stored on codels 28, 29, and 30 are sent in the same manner. After the digit stored on storage unit codel 30 has been sent, the transender again closes a ground pulse to lead 12SC.

If the call is a seven digit call, the wipers of switch 16SS are engaged on bank terminal N. The ground pulse on lead 12SC energizes magnet 16OS and closes the number one winding of relay 3ES via 12SH10, 2PS1, 1KC5, 5EN5, 10BN5, 14NS1, level B of switch 16OS engaged on bank terminal N, the ON1 springs of 16SS, to the number one winding of 3ES, and the 150 ohm resistor, 3R18, to exchange battery. Relay 3ES operates, locks shunts the number one winding of relay 1DA to prevent it from operating, further opens the circuit of relay 14NS, and shunts the number one winding of relay 5EN. When the ground pulse is removed from lead 12SC, the shunt from the first winding of relay 5EN is removed and magnet 16OS is opened. Switch 16OS restores and advances its wipers to bank terminal 1. Relay 5EN operates, locks through its "X" contacts 5EN1, and starts the switch through the cycle of operation as described in the subsequent section titled "Switch Through."

If the call is an eight digit call, switch 16SS should be in its normal position (1st bank position) by the time the digit stored on codel 30 has been sent. The succeeding ground pulse on lead 12SC energizes magnet 16OS, as on a seven digit call, but does not close the circuit to the first winding of relay 3ES.

After the pulse, switch 16OS advances its wipers to bank position 1 and the digit stored on codel 31 is then sent by the transender. After this digit has been sent, the transender again closes a ground pulse via lead 12SC, 12SH10, 2PS1, 1KC5, 5EN5, 10BN5, 14NS1, level B of switch 16OS engaged on bank position 1, 11SM14 the number one winding of relay 3ES, to resistor 3R18 and exchange battery. Relay 3ES operates, locks, and shunts the first winding of relay 5EN. When the ground pulse is removed, the shunt is removed from the first winding of relay 5EN. Relay 5EN operates, locks through its number two winding, and starts the switch through the cycle of operation as described subsequently.

If the transender received a "hold sending" mark from the translator, the transender will not begin sending until the subscriber has dialed the seventh digit of seven or eight digit calls or the tenth digit of ten or eleven digit calls and the ticketer forwards a "start sending" mark. Depending on whether relay 11MS operates (more than six digits) or not, the "start sending" mark is sent to the translator following the subscriber dialing of the sixth or seventh digit. Provisions are made to start sending sooner if it is so desired. Assuming a seven digit called number switch 16SS advances its wipers to bank terminal 10 and closes ground via contacts 6BA3, 12CA7, the level B wiper of switch 16SS, 3KE2, 9H3, 12SF1, 5GT3, 12SH1 to lead 12FT to the transender to initiate sending.

SENDING FOR TEN OR ELEVEN DIGIT CALLS

After the transender has received the three area code digits over lead 12WP, it decides whether or not the ABC office code is also required for a translation. In either case, when it has received the required digits, it starts the cycle of operation whereby the transender is supplied with translated information from the translator. When this information is received, the sending cycle is the same as previously described in the preceding section with the following exceptions:

When switch 16OS steps to bank terminal 5, it does not step self-interrupted to bank terminal 8 since relay 15LH has operated and removed the ground from level A bank terminals 5, 6, and 7.

After the tenth digit (fourth terminal digit) has been sent, the transender closes a ground pulse to lead 12SC. If an eleventh digit (fifth terminal digit) has been dialed by this time, switch 16SS is in its normal position (1st bank contact). Thus, the pulse on lead 12SC steps switch 16OS to bank position 1, but does not close a circuit to relay 5EN at this time, as in a seven or ten digit call. The transender then sends the eleventh digit stored on codel 31. After this digit has been sent, the transender again closes a ground pulse over lead 12SC to switch 16OS and the number one winding of relay 3ES. Relay 3ES operates, locks through its number two winding, and shunts the number one winding of relay 3EN. When the pulse is removed from lead 12SC, the shunt is removed from the number one winding of relay 3EN and switch 16OS circuit is opened. Relay 3EN operates, locks, and starts the switch through the cycle of operation as described in Section titled "Switch Through."

STOP-DIAL AND FLASHING SIGNAL SUPERVISION

If stop-dial supervision is encountered during the sending interval, ground is closed via lead 6EC to the number one winding of relay 6AN. Relay 6AN operates and closes ground over lead 3PH to the transender to hold further sending until the stop-dial supervision is removed.

If a flashing signal is closed to lead 6EC during the sending interval, relay 6AN follows the pulses and repeats them over lead 3PH to the transender. During the second pulse the transender opens lead 12HT. Relay 12SF restores, removes the shunt from resistor 12R9, and closes the number one winding of relay 10FC. Relay 10FC operates locks through its number 2 winding, opens its original operating path, closes busy tone to the calling party via lead 1RL, closes holding circuits for the second winding of relay 6AN and the second winding of relay 4BB, opens the circuit to relay 12SH, and removes the operating ground for magnet 16SS and codels 21 through 31. Relay 12SH restores. Relay 6AN, which is held operated on its second winding by relay 10FC, closes lead 60 IPM at contacts 6AN10 through resistor 6R3 to the supervisory lamp 4SL and lead 2SL. The lamp 4SL flashes dimly at 60 IPM. The ticketer thus remains operated until the calling party disconnects.

SWITCH THROUGH (Operated: Relays 7AA, 5AB, 6BA, 10BN, 4BB, 11SM, 12SH, 6BS, 9H, 12SF, 7HA, 7G, 9HB, 5HD, 1KC, 13ON, 3ES, 5EN, various codels, and possibly 15LH, 10TE, and 14PB and/or 14PC)

Prior to sending, the seized ticketer selector or trunk circuit closes ground to the control lead 5C. When relay 5EN operates fully after sending is completed, it opens the number one winding of relay 7AA and 12SH, closes a circuit to the number two winding of relay 6BA to ground on lead 5C, transfers lead 2CL, to ground on lead 5C, and switches through the preceding selector to the ticketer selector or trunk circuit. Relay 7AA restores and opens the circuit to the first winding of relay 6BA, 5AB, and 10BN. Relay 5AB restores. Relay 6BA remains operated on its number 2 winding. Relay 12SH restores and opens leads 12HT, 12SR, 12ST, 12SC, 12XT, 12YT, and 12ZT to the transender hunter. When lead 12HT is opened, the associated transender is released and relay 12SF is opened. Relay 12SF restores and transfers the holding circuit for the codels through resistor 12R9.

Relay 10BN restores, closes ground over lead 5CT to the Ticketer selector or trunk circuit to indicate cut-through, and opens the circuit to relays 5HD, the first winding of relay 11SM, second winding of relay 11MS, 14PB, the number two winding of relay 13ON, 14PC, 1KC, 7HA, and the #2 winding of relay 9HB. Relays 5HD, 11SM, 13ON, 9HB, 11MS, 1KC, 7HA, 14PC and/or 14PB (if operated) restore. Relay 13ON restores and opens the circuit to relay 10TE. Relay 10TE restores (if operated).

CALLED PARTY ANSWERS (Operated: Relays 6BA, 4BB, 6BS, 9H, 7G, 3ES, 5EN, various codels, and possibly 15LH)

When the called party answers, "answer" supervision is relayed through the trunk circuits and through the ticketer selector or trunk circuit to this circuit by ground over lead 6EC to the number one winding of relay 6AN.

Relay 6AN operates, extends relay 8TP to a source of 1 sec. time pulses on lead 5CTP via lead TP1, and transfers the supy lamp 4SL and lead 2SL from direct ground to lead 60IPM through resistor 6R3. This causes the supy lamp 4SL to flash dimly at 60 i.p.m. to indicate that the call has been answered. Relay 8TP follows the pulses on lead 5CTP and pulses at the rate of one pulse per second.

CONVERSATION TIMING (Operated: Relays 6BA, 4BB, 6BS, 9H, 7G, 3ES, 5EN, 6AN, 8TP (60 i.p.m.), various codels, and possibly 15LH)

This ticketer times the length of conversation and provides a maximum 180 minute timing interval. The conversation time is accumulated on rotary switches 8PC, 17MU and 17MT. Although the conversation timing cyle begins when answer supervision is received, a "grace period" (normally 5 seconds) is provided before any conversation time is actually registered. Immediately after this "grace period," the first minute of conversation is registered. At the end of the first minute of conversation, the second minute is registered, etc., until the end of the call or the 180 minute timing interval elapses. The "grace period" is designed to prevent ticketing of calls to wrong numbers, and it can be varied by relocating leads 8A on level B bank terminals of switch 8PC.

Relay 8TP operates from the first pulse on lead 5CTP following the operation of 6AN and closes 6TD. Relay 6TD operates and closes its holding circuit through the number two winding of 8TC which is shunted for the duration of the pulse. At the end of this pulse, 8TP restores and removes the shunt from 8TC. Relay 8TC operates in series with 6TD and transfers the 8TP pulsing circuit through the number one winding of 8TC to switch 8PC.

Relay 8TP operates on the second pulse on lead 5CTP and closes magnet 8PC through the first winding of relay 8TC. Magnet 8PC operates. At the end of this second pulse, magnet 8PC restores, and the wipers of switch 8PC are advanced one step.

Relays 8TC and 6TD remain operated and the wipers of switch 8PC are now stepped once each second until they reach bank terminal 4 at the end of the fifth pulse. At this time switch 19SEND steps, self-interrupted, to bank terminal 1 and closes a circuit to relay 8BD. The wipers of switch 19SEND remain engaged on bank terminal 1 until the end of conversation, at which time switch 19SEND begins transferring the ticketing information to the tabulator. Relay 8BD operates, removes the shunt from interrupter springs 8PC2 closes a circuit to relay 6BF at 8BD4, and closes ground at contacts 8BD9 through resistor 6R2 to lead 2SL and the supy lamp 4SL. The supy lamp 4SL lights dimly to indicate that conversation timing has started. Relay 6BF operates, closes a multiple circuit from relay 8TP to lead 5TP1, and closes a multiple ground to the number two winding of relay 8TC.

On the seventh pulse relay 8TP operates and closes magnet 8PC through the number one winding of relay 8TC. Magnet 8PC operates and opens its interrupter springs 8PC2. The interrupter springs open the hold circuit of 6TD. Relay 6TD restores but 8TC remains operated on its number one winding for the duration of this pulse. Relays 8TP and 8TC and magnet 8PC restore at the end of the pulse. The wipers of which 8PC are advanced to bank terminal 6.

On the eight pulse relay 8TP operates and closes 6TD. Relay 6TD operates and closes its holding circuit through the number two winding of relay 8TC. When relay 8TP restores at the end of this pulse, relay 8TC operates in series with relay 6TD and transfers the relay 8TP pulsing circuit to switch 8PC.

On the ninth pulse relay 8TP and magnet 8PC operate. Relay 6TD restores, but 8TC remains operated on its number one winding for the duration of the pulse. At the end of this pulse, relays 8TP and 8TC and magnet 8PC again restore. The wipers of switch 8PC are advanced to bank terminal 7.

In this manner, alternate pulses from 8TP now step switch 8PC at the rate of one step every two seconds.

Switch 8PC is used for counting groups of 30 pulses but is a 33 step switch mechanism. Each time the wipers of level A step to bank terminal 10, ground is closed through these wipers and interrupter springs 8PC1 to magnet 8PC. Thus, every time the level A wipers step to bank terminal 10, switch 8PC steps self-interrupted and advances its wipers one step without changing the count.

Level A of switch 8PC is thus scanned at twenty second intervals. Level B has two of its three wipers removed and is, therefore, scanned only once each minute.

At the end of the first and each succeeding minute the level B wiper of switch 8PC is engaged on bank terminal 4 and relays 6TD and 8TC are operated. On the next pulse following each minute, 8TP operates, closes magnet 8PC, and closes ground to the level B wiper springs 8BD1, 8TC2, 8TC1 to magnet 17MU. Magnet 8PC operates and opens 6TD. Magnet 17MU operates. At the end of these pulses switch 8PC advances its wipers to bank terminal 3 and switch 17MU advances its wipers one step. In this manner switch 17MU registers the unit minute digits in codel code on leads W34, Y34, X34, and Z34.

After nine minutes the level B wiper of switch 8PC is again engaged on bank terminal 4 and the wipers of switch 17MU are engaged on bank terminal 8. Upon the next pulse following the operation of relays 6TD and 8TC, relay 8TP closes magnet 8PC, 17MU and 17MT. At the end of this pulse, switches 8PC, 17MU and 17MT advance their wipers one step. Switch 17MU steps self-interrupted from ground on level A bank terminal 9 and advances its wipers to bank terminal 10. A ten minute interval will elapse before the wipers of switch 17MU again engage bank terminal 8. After each subsequent ten minute interval when switch 17MU engages bank terminal 8, switch 17MT advances its wipers one step. Levels A and B of switch 17MT are scanned at hundred minute intervals and thus mark in codel form the ten minute digits on leads W33, Y33, X33 and Z33. The wipers of level C, E, and F have two of their three wipers removed and are spaced one hundred minutes apart. (Switch 17MT also is a 33 step mechanism, but when the level C and E wipers engage bank terminal N, it steps self-interrupted and advances its wipers one step.) Level C is scanned during the first hundred minute interval, level E during the second hundred minute interval, and level F during the third hundred minute interval. One wiper of level D is removed to have this level scanned only during the second and third hundred minute intervals. Thus, the hundred minute digits are registered in codel form on leads W32, X32, Y32, and Z32.

The ticketer is capable of registering the conversation time up to a maximum of 309 minutes, but will release the circuit after 180 minutes to avoid overlap in areas using three rate periods. Should the conversation timing reach 180 minutes, relay 10TE operates from ground on the level E wiper of switch 17MT engaged on bank terminal 8.

Relay 10TE, in operating, closes ground to lead X32, closes lead 60IPM to the supy lamp 4SL, and prepares the circuit to relay 10FC. The supervisory lamp 4SL flashes brightly at 60 i.p.m. to indicate that 180 minutes of conversation time have elapsed. At this time leads W32, Z32, and Z33, and Z34 are grounded and the digits "180" are registered. Forced release will now take place.

END OF CONVERSATION (Operated: Relays 6BA, 4BB, 6BS, 9H, 7G, 3ES, 5EN, 6AN, 8TP, 8BD, 6BF, various codels, and possibly 15LH, and 6TD and/or 8TC)

When the called party disconnects before using the available 180 minutes of conversation time, "on hook" supervision is relayed from the trunk circuit through the ticketer selector to this circuit as the removal of ground from lead 6EC. Relay 6AN restores. When the calling party disconnects, the ticketer selector and, the trunk circuit are released and ground is removed from lead 5C. Relay 6BA restores. However, this switch is held operated by mutually locked relays 4BB and 8BD through level A of switch 19SEND and will not release until the stored call information has been transferred to a tabulator.

When relay 6AN restores, it transfers the supervisory lamp 4SL and lead 2SL from resistance 6R2 ground to lead 120IPM through resistor 6R2. The supervisory lamp 4SL flashes dimly at 120 i.p.m. to indicate that the call is completed and the ticketer is waiting for a tabulator.

When relay 6BA restores, it closes the number one winding of relay 4BC and opens the circuit of relay 6BF. Relay 4BC operates, locks, short circuits its number two winding, closes ground to lead 13P via the number one winding of relay 13GA, closes a circuit to relay 13GE, and closes ground to lead 2CL, guard this switch against seizure. Relay 6BF restores and opens 8TP which restores to prevent further timing. Relay 13GE operates, removes ground from lead 13H, and closes ground to lead 13TST to seize the translator allotter.

If, after the called party disconnects and ground has been removed from lead 6EC, the calling party fails to disconnect immediately, the following circuit operations will happen. Switch 8PC will continue to step as explained to bank terminal 1. The previous operation of 6BF permits this stepping. When the level A wipers of switch 8PC are engaged on bank terminal 1, a circuit is closed to relay 10CF. Relay 10CF operates, locks to springs 4BC6, and prepares a circuit to the number one winding of relay 7AC. Switch 8PC continues to step. When switch 8PC engages its level A wipers on bank terminal 9, a circuit is closed to the number one winding of relay 7AC. Busy tone is closed to the calling party via leads 1RL for a local access call and lead RU for a distant office access call. The release of this circuit is as explained earlier with the following exceptions: When the calling party disconnects after hearing busy tone, the loop is opened to relay 7AA. Relay 7AA restores and opens the circuit to the number one winding of relay 6BA and 5AB which restores. Relay 6BA restores and opens the circuit to relay 10BN. When relay 4BC operates, relay 10CF is opened. Relay 10CF restores. Also, when relay 10BN restores, holding ground is removed from the second winding of relays 4BB, 10FC, 7HC, 9HB, and 5HD. These relays restore.

TRANSFERRING TICKETING INFORMATION TO A TABULATOR (Operated: Relays 4BB, 6BS, 9H, 7G, 3ES, 5EN, 8BD, various codels, 4BC, 13GE, and possibly 15LH)

Absence of ground on lead 13H permits a tabulator to step on this switch.

When a tabulator is connected to this switch, a circuit is closed to the number one winding of relay 13GA via lead 13P and a "continuity check" is taken. Relay 13GA operates its "X" contacts 13GA4, and locks on its number two winding. Relay 13GA operates fully, opens its number one winding, closes leads 13P to switch 19SEND, short circuits resistor 12R9, and opens the circuit of relay 13GE. Relay 13GE restores, opens lead 13TST, and closes ground to lead 13H.

Switch 19SEND in this circuit will step in unison with a switch in the tabulator under the control of the same relay. Switch 19SEND rapidly transfers ticketing and record data to the switch in the tabulator. As the wipers of switch 19SEND are advanced one step at a time, ground is closed on the various bank terminals over lead 19W, 19X, 19Y, and 19Z to operate storage relays in the tabulator.

The order in which the data is transferred to the tabulator is as follows:

| Bank Term. | Seven or Eight Digit Calls | |
|---|---|---|
| 2 | Called Number | Office Code "A" digit (Codel 21). |
| 3 | do | Office Code "B" digit (Codel 22). |
| 4 | do | Office Code "C" digit (Codel 23). |
| 5 | No information | |
| 6 | do | |
| 7 | do | |
| 8 | Calling Number | Office Code "A" digit (Codel 1). |
| 9 | do | Office Code "B" digit (Codel 2). |
| 10 | do | Office Code "C" digit (Codel 3). |
| 11 | Conversation Time | Hundreds digit (minutes) (Codel 32). |
| 12 | do | Tens digit (minutes) (Codel 33). |
| 13 | do | Units digit (minutes) (Codel 34). |
| 14 | | Level B absence of ground indicates a seven or eight digit call. |
| | | Level C ticketer identity hundreds digit. |
| | | Level D ground indicates a change of toll rates during call. |
| 15 | Ticketer Identity | Tens digit. |
| 16 | do | Units digit. |
| 17 | Called Number | 1st terminal digit (Codel 27). |
| 18 | do | 2nd terminal digit (Codel 28). |
| 19 | do | 3rd terminal digit (Codel 29). |
| 20 | do | 4th terminal digit (Codel 30). |
| 21 | do | 5th terminal digit (Codel 31) (Eight digit calls only). |
| 22 | Calling Number | 1st terminal digit (Codel 4). |
| 23 | do | 2nd terminal digit (Codel 5). |
| 24 | do | 3rd terminal digit (Codel 6). |
| 25 | do | 4th terminal digit (Codel 7). |

| Bank Term. | Ten or Eleven Digit Calls | |
|---|---|---|
| 2 | Called Number | 1st area code digit (Codel 21). |
| 3 | do | 2nd area code digit (Codel 22). |
| 4 | do | 3rd area code digit (Codel 23). |
| 5 | do | Office Code "A" digit (Codel 24). |
| 6 | do | Office Code "B" digit (Codel 25). |
| 7 | do | Office Code "C" digit (Codel 26). |
| 8 | Calling Number | Office Code "A" digit (Codel 1). |
| 9 | do | Office Code "B" digit (Codel 2). |
| 10 | do | Office Code "C" digit (Codel 3). |
| 11 | Conversation Time | Hundreds digit (minutes) (Codel 32). |
| 12 | do | Tens digit (minutes) (Codel 33). |
| 13 | do | Units digit (minutes) (Codel 34). |
| 14 | | Level B ground indicates a ten or eleven digit call. |
| | | Level C ticketer identity hundreds digit. |
| | | Level D ground indicates a change of toll rates during call. |
| 15 | Ticketer Identity | Tens digit. |
| 16 | do | Units digit. |
| 17 | Called Number | 1st terminal digit (Codel 27). |
| 18 | do | 2nd terminal digit (Codel 28). |
| 19 | do | 3rd terminal digit (Codel 29). |
| 20 | do | 4th terminal digit (Codel 30). |
| 21 | do | 5th terminal digit (Codel 31) (Eleven digit calls only). |
| 22 | Calling Number | 1st terminal digit (Codel 4). |
| 23 | do | 2nd terminal digit (Codel 5). |
| 24 | do | 3rd terminal digit (Codel 6). |
| 25 | do | 4th terminal digit (Codel 7). |

When all information has been transferred, switch 19SEND steps to bank terminal N and opens the circuit of relay 8BD.

RELEASE FROM COMPLETED AND TIMED CALL (Operated: Relays 4BB, 6BS, 9H, 7G, 3ES, 5EN, 8BD, 4BC, 13GA, various codels, and possibly 15LH)

Relay 8BD restores, closes direct ground to lead 2SL and the supervisory lamp 4SL, opens the circuit to the number one winding of relay 4BB and removes a short circuit from the number one winding of relay 4BC. The supervisory lamp 4SL lights brightly to indicate that all information has been transferred from this circuit to the tabulator. Relay 4BB restores, removes the short circuit from relay 4BE and closes a circuit to relay 4BE in series with magnets 8PC and 18PS, restores relays 15LH and 13TR (if operated), removes ground from lead 5CT, and opens the circuit of relays 6BS, 3ES, 9H, 7G, and 5EN. Relays 5EN, 9H, 7G and 3ES restore. Relay 4BE operates in series with the motor magnets (8PC and 18PS), grounds lead 6RLS.ALM., places a locking ground on the number one winding of relay 4BC and closes lead 2SL and the supervisory lamp 4SL to lead 120IPM. The supervisory lamp 4SL flashes brightly at 120 i.p.m. to indicate that the ticketer is restoring to normal. Relay 6BS restores and removes the holding ground from all the storage relays. These relays restore.

Switches 18PS, 8PC, 17MU, 17MT, 16SS, 16OS, and 19SEND step self-interruptedly to their normal position. During the above "homing," relay 4BE remains operated from battery through the various magnets. When all switches are in normal position, relay 4BE restores, removes the 120 i.p.m. ground pulses from the supervisory lamp 4SL and lead 2SL, and opens the circuit to the number one winding of relay 4BC. Relay 4BC restores, opens the circuit of the number two winding of relay 13GA, opens lead 2SL from the supy lamp 4SL, removes ground from lead 2HU, and replaces ground with resistance battery on lead 2CL. Relay 13GA restores.

The Ticketer is now idle and ready to ticket another call.

RELEASE FROM INCOMPLETED CALL (Operated: Relays 6BA, 4BB, 6BS, 9H, 7G, 3ES, 5EN, various codels, and possibly 15LH)

If the call is not answered, 6AN never operates, hence relay 8BD does not operate. When the calling party disconnects, the ticketer selector or trunk circuit releases and removes ground from lead 2CL. The preceding equipment releases. Relay 6BA restores, closes a circuit to the number one winding of relay 4BC and opens the circuit to the number one winding of relay 4BB. Relay 4BC operates and grounds leads 2CL, to guard this switch against seizure. Relay 4BB restores, opens 3ES, 9H, 7G, and 5EN, opens 15LH (if operated) and closes low resistance ground through relay 4BE to magnets 18PS and 16SS. Relays 5EN, 3ES, 9H, and 7G restore. Relay 4BE operates, closes ground to lead 6RLS.ALM., closes ground to the first winding of relay 4BC to hold relay 4BC operated and transfers the supervisory lamp 4SL and lead 2SL from ground to lead 120IPM. The supervisory lamp 4SL flashes brightly at 120 i.p.m. to indicate that the ticketer is restoring to normal condition. Relay 6BS restores and opens the holding circuit for all the storage relays. These relays restore.

Switches 18PS and 16SS step, self-interrupted, to normal position. In the same manner, switch 16OS and then switch 19SEND step to normal position. Relay 4BE restores, removes the 120 i.p.m. ground pulses from the supervisory lamp 4SL and lead 2SL, removes ground from lead 6RLS.ALM and opens the circuit to the first winding of relay 4BC. Relay 4BC restores, opens lead 2LS, removes ground from lead 2HU and replaces ground with resistance 6R7 battery on lead 2CL. The ticketer is now idle and free to ticket another call.

FORCED RELEASE (Operated: Relays 4BB, 6BA, 6BS, 9H, 7G, 3ES, 5EN, 6AN, 8TP, various codels, and possibly 15LH and 10TE)

If the call is not released before the end of 180 minutes, relay 10TE operates as explained in an earlier section. The wipers of switch 8PC are now engaged on bank terminal 2 and a circuit is closed from ground at contacts 4BC6, via 4BB12, level B of switch 8PC engaged on bank contact 2, 8BD8, 8TC2, 8TP2, level C of switch 17MU engaged on bank terminal 10, 10TE5, to the first winding of relay 7HC. Relay 7HC operates and closes a circuit to the first winding of relay 10FC. Relay 10FC operates and opens the circuit to relay 5EN. Relay 5EN restores, opens the circuits of 8TP which restores, grounds lead 10FC supy, transfers the calling party's loop from lead 5T and 5R to relay 7AA and 9PA, closes 10BN, opens the circuit to the second winding of relay 6BA, removes ground from lead 5C, closes busy tone to the calling party via leads 1RU and 1RL to indicate that this circuit is about to be released, removes ground from lead 5C, and closes ground to lead 2CL. Relay 6BA is slow-to-release and remains operated momentarily. Relay 7AA operates and closes the circuit to the first winding of relay 6BA. Relay 10BN operates, closes a holding path for the second windings of relays 10FC, 4BB, and 7HC, and closes a circuit to relay 9HB through resistor 7R10. Relay 9HB operates, locks, and closes a circuit to relay 5HD. Relay 5HD operates, removes relay 9PA from the calling party's loop, and closes both windings of relay 7AA across the loop. Removal of ground causes the preceding switch train to release. If the calling party has not released at this time, the switch train will release and lock the calling party to the line equipment.

When the switch train releases the loop to 7AA is opened. Relay 7AA restores and opens the circuit of relay 6BA. Relay 6BA restores and causes this circuit to transfer the ticketing information to the tabulator and to release.

CALLED PARTY BUSY (Operated: Relays 6BA, 4BB, 6BS, 9H, 7G, 3ES, 5EN, various codels, and possibly 15LH)

If the called line is busy, busy supervision is relayed through the trunk circuits and through the ticketer selector to this circuit as ground pulses on lead 6EC. Relay 6AN operates on its first winding on the first pulse, locks through its second winding to ground at level A bank terminal N of switch 8PC, and closes the circuit of relay 8TP to lead 5CTP via lead 5TP1. Relay 8TP follows the first two pulses on lead 5CTP and steps switch 8PC to bank terminal 1. As switch 8PC advances to bank terminal 1, the holding circuit of 6AN is opened. Relay 6AN restores between pulses on lead 6EC and closes a circuit through the level A wipers engaged on bank terminal 1 of switch 8PC to relay 10CF. Relay 10CF operates, locks to bank terminal 1, level A of switch 8PC, prepares to close the circuit to magnet 18SD, and closes a circuit to the first winding of relay 7HC.

Each time lead 6EC is grounded, relay 6AN operates; closes a circuit to magnet 18SD, and shunts the second winding of relay 8TC. After each pulse on lead 6EC, relay 6AN restores; opens the circuit of magnet 18SD, and removes the shunt from the second winding of relay 8TC. Switch 18SD advances its wipers to the next bank terminal after each pulse. However, due to the flashing signal on lead 6EC which 6AN will follow, relay 8TC and magnet 8PC are unable to complete a full cycle of operation. Therefore, switch 8PC remains on bank terminal 1.

When the level B wipers of switch 18SD engage on bank terminal 3, a circuit is closed to the first winding of relay 7HC.

Relay 7HC operates and closes a circuit to the second winding of relay 3ES. Relay 3ES restores. Relay 5EN restores, closes a circuit to relay 10BN, transfers the calling party's loop from leads 5T and 5R to relays 7AA and 9PA, closes ground to lead 2CL, closes busy tone to the calling party via lead 1RL and 1RU, closes lead 10FC supy, and opens the circuit to the second winding of relay 6BA. Relay 7AA operates and closes a circuit to the first winding of relay 6BA. (Relay 6BA remained operated due to slow-to-release characteristics.) Relay 10BN operates, closes a holding path to the second winding of relay 10FC and 7HC and closes the second winding of relay 9HB through resistor 7R10. Relay 9HB operates, locks and closes a circuit to relay 5HD. Relay 5HD operates and transfers the calling loop to both windings of relay 7AA. The circuit remains thus operated until the calling party disconnects.

RELEASE FROM A CALLED PARTY BUSY CONDITION (Operated: Relays 7AA, 6BA, 6BS, 9H, 7G, various codels, 10CF, 10FC, 10BN, 9HB, 5HD, 6AN—following pulses on lead 6EC, and possibly 15LH)

When the calling party disconnects after receiving busy tone, the loop is opened to relay 7AA. Relay 7AA restores and opens the circuit to the first winding of relay 6BA. Relay 6BA restores, closes a circuit to the first winding of relay 4BC, removes ground from lead 2CL to release the preceding equipment, opens the circuit to the first winding of relay 4BB, and opens the circuit of relay 10BN. Relay 4BC operates, closes ground to lead 2CL, and removes ground from bank terminal 2 level A of switch 8PC which opens the circuit of relay 10CF. Relay 10CF restores. Relay 10BN restores and removes the holding ground from the second winding of relays 4BB, 10FC, 7HC, 9HB, and 5HD. These relays restore. Relay 10FC in restoring, opens lead 10FC supy. Relay 4BB, in restoring closes low resistance ground through relay 4BE to switches 18PS and 8PC and opens the circuit to relays 6BS, 15LH, 9H, and 7G. Relay 4BE operates, closes ground to lead 6RLS.ALM., closes an additional ground to the first winding of relay 4BC and transfers the supervisory lamp 4SL and lead 2SL from 60IPM to lead 120IPM. The supervisory lamp 4SL flashes brightly at 120 i.p.m. Relay 6AN restores. Relay 6BS restores and opens the circuit to all of the storage relays. The relays restore. Relays 9H and 7G restore. Relay 15LH, if operated restores.

Switches 18PS and 8PC step, self-interrupted, to normal position. In the same manner, switches 16SS, 16OS and then 19SEND, step to normal position. Relay 4BE restores, removes the 120 i.p.m. ground pulses from the supervisory lamp 4SL and lead 2SL, removes ground from lead 6RLS.ALM., and opens the circuit to the first winding of relay 4BC. Relay 4BC restores, opens lead 2SL, removes ground from lead 2HU and replaces ground with resistance battery on lead 2CL.

The ticketer is now idle and free to ticket another call.

RELEASE FROM A FLASHING SIGNAL CONDITION (Operated: Relays 7AA, 6BA, 6BS, 9H, 7G, various codels, 5AB, 10BN, 4BB, 11SM, 12SH, 12SF, 7HA, 5HB, 5HD, 1KC, 13ON, 10FC, 6AN, and possibly 15LH, 10TE, and 14PB and/or 8PC)

When the calling party disconnects after receiving busy tone due to the flashing signal on lead 6EC during sending, the loop circuit is opened to the first winding of relay 7AA. Relay 7AA restores and opens the circuit to the first winding of relay 6BA and relay 5AB. Relay 5AB restores. Relay 6BA restores, closes the circuit to the first winding of relay 4BC, removes ground from lead 2CL to release the preceding equipment, opens the circuit to the first winding of relay 4BB, and opens the circuit of relay 10BN. Relay 4BC operates and closes ground to lead 2CL. Relay 10BN restores and removes the holding ground from the second winding of relays 4BB, 10FC, the first winding of relays 11SM, 14PC and 14PB (if operated), 7HA, second winding of relay 9HB, 1KC, 5HD and 13ON. These relays restore. Relay 10FC, in restoring, opens the holding circuit to relay 6AN. Relay 4BB, in restoring, closes low resistance ground through relay 4BE to switches 18PS and 16SS, opens the circuit to the second winding of relay 15LH (if operated), and opens the circuit to relays 6BS, 9H, and 7G. Relay 4BE operates, closes ground to lead 6RLS, closes an additional ground to its first winding of relay 4BC to hold relay 4BC operated, and transfers the supervisory lamp 4SL and lead 2SL from lead 60IPM to lead 120IPM. The supervisory lamp 4SL flashes brightly at 120 i.p.m. to indicate that the ticketer is restoring to normal condition. Relay 6AN restores. Relay 15LH (if operated) restores. Relay 6BS restores and opens the holding circuit for all the storage relays. The relays restore. Relays 9H and 7G restore. Relay 13ON in restoring opens the circuit to relay 10TE which restores.

Switches 18PS and 16SS step, self-interrupted, to normal position. In the same manner, switch 16OS and then switch 19SEND step to normal position. Relay 4BE restores, removes the 120 i.p.m. ground pulses from the supervisory lamp 4SL and lead 2SL, removes ground from lead 1RLS, and opens the circuit to the first winding of relay 4BC. Relay 4BC restores, opens lead 2SL, removes ground from lead 2HU, and replaces ground with resistance 6R7 battery on lead 2CL.

The ticketer is now idle and free to ticket another call.

FORCED RELEASE ON UNANSWERED CALLS (Operated: Relays 6BA, 4BB, 6BS, 9H, 7G, 3ES, 5EN, various codels, and possibly 15LH)

If the called party fails to answer and the calling party "camps on" this circuit, forced release will take place.

When the calling party switches through to the called line, relay 5EN operates fully and closes ground to a supervisory and alarm circuit (not shown) via lead 5EN2. Lead 5EN2 is closed to lead 6EC once every minute under the control of a pulsing relay in the supervisory circuit. On the first pulse ground is closed to 6AN. Relay 6AN operates, locks through its second winding to ground at level A bank terminal N of switch 8PC, and closes relay 8TP to lead 5CTP. Relay 8TP follows the first two pulses on lead 5CTP and steps switch 8PC to bank terminal 1 as explained earlier. As switch 8PC advances to bank terminal 1 the circuit to 6AN is opened. Relay 6AN restores and closes a circuit to the level A wipers of switch 8PC engaged on bank terminal 1 to relay 10CF. Relay 10CF operates, locks to bank terminal 1, level A of switch 8PC, prepares a circuit to the motor magnet of switch 18SD and closes a circuit to the number one winding of relay 7HC.

Each time lead 6EC is closed to lead 6EN2 (once a minute) ground is closed to 6AN. Relay 6AN operates and restores as explained previously except that the operation of 6AN takes place only once a minute.

After 3–4 minutes a circuit is closed to the number one winding of relay 7HC with switch 18SD engaged on bank terminal 3. The remaining operations are as explained in the two penultimate preceding sections.

GROUND FAULT ON LINE

If there is a low resistance ground leak on either the "tip" or "ring" side of the calling line, relay 9PA will operate either as the ticketer is seized or as the first dial pulse is received. During the first two pulses of relay 7AA, relays 14PC and 14PB are operated. Relay 14PB operates and closes a ground potential from contacts 14PB1 to the number two winding of relay 5GT. Relay 5GT operates, locks through its "X" contacts 5GT7 and prepares to close ground over lead 12YT to the transender. No further operation occurs until the subscriber dials. Operation during the dialing is similar to that described earlier with the exception that upon completion of the digit, ground is closed to the second winding of relay 7HC and relay 2KA will not operate. Relay 7HC operates, locks through its second winding, closes resistance battery to lead 12SC, opens lead 12WP, and closes ground over lead 12YT to the transender. When ground is closed to lead 12YT, either of two alternative procedures is provided by the transender as described in the succeeding section.

SPECIAL ROUTING DIRECTIVES OR BUSY TONE

Should ground be closed over leads 12XT or 12YT to the transender before a translation has been provided, the transender will follow either of two alternatives. Depending on its wiring, the transender will either send a special routing directive to route the call to an operator, or it will release itself and cause the ticketer to send busy tone to the calling party.

TRANSENDER STRAPPED FOR SENDING SPECIAL ROUTING DIRECTIVE

When the transender receives ground on leads 12XT or 12YT, it begins transmitting the sending control digit "0" over lead 12SC to relay 14NS via contacts 12SH10, 2PS1, 15C5, 5EN5, 10BN5, 3ES7 and 11SM12 and magnet 16OS from contacts 1KC5. Relay 14NS, being slow-to-release, operates on the first pulse and remains operated for the duration of the sending control pulses. Magnet 16OS follows the pulses and steps to bank terminal 10. After the last pulse relay 14NS restores.

After the transender has completed the sender control digit, it begins sending a special routing directive, usually consisting of one or two digits. The transender sends this special routing directive in the form of loop pulses on leads 12SR and 12ST.

After the special routing directive has been sent, the transender closes a ground pulse over lead 12SC to magnet 16OS and winding number one of relay 3ES. During the pulse, relay 3ES operates its "X" contacts 3ES7, locks on its number two winding, operates fully, and shunts the first winding of relay 5EN.

After the pulse, switch 16OS steps to its normal position and the shunt is removed from first winding of relay 5EN. Relay 5EN operates and locks on its second winding.

When relay 5EN operates fully, it starts a cycle of operation similar to that described in an earlier section titled "Switch Through," except that relays 7HC and 5GT also restore when relay 10BN restores. The calling party is now switched-through to an operator for special handling of the call.

TRANSENDER STRAPPED FOR PROVIDING BUSY TONE TO CALLING PARTY

When the transender receives ground on either lead 12XT or 12YT, it starts the cycle of operations whereby lead 12HT is opened. When lead 12HT is opened, relay 12SF restores and closes a circuit to the first winding of relay 10FC. Relay 10FC operates its "X" contacts 10FC5, locks on its number two winding, closes busy tone 10BT through capacitor 10C4 to lead 1RL, opens the circuit to relay 12SH, opens a circuit to its first winding, closes ground to lead 10FC supy and closes a holding to the second winding of relay 4BB. Relay 12SH restores. The ticketer remains thus operated until the calling party disconnects.

In case there is no response to the attempt to get calling party identity, relay 10FC will operate and since relay 1KC, 3KE or 7HC did not operate, relay 10FC is locked on its second winding through the release key to ground at contacts of relay 4BB. When the calling party restores, relay 4BC operates and all the other relays restore, except relays 10FC, 4BB, 14PB (if operated), 4BC, 7HC, 6BS, 7HA, 9HB, 5HD and all the operated storage relays. The ticketer will thus remain operated until the release key is operated. Operation of the release key causes the ticketer to release completely.

If the transender sends a digit consisting of more than 10 pulses while sending the called number, it stops all further sending. After a delay interval designed to allow the subscriber time to finish dialing, the transender opens lead 12HT. Relay 12SF restores and closes the circuit to the first winding of relay 10FC. Relay 10FC operates and locks on its second winding from the ground potential on the level A wiper of switch 16SS engaged on bank terminal 10. All relays restore with the exception of relays 10FC, 4BB, 11SM, 14PB (if operated), 4BC, 6BS, 15LH (if operated), 7HA, 9HD, 5HD, and all the operated storage relays. The ticketer will thus remain operated until the release key is operated at which time it will release completely.

INCOMPLETE DETECTION

If an incomplete or double detection occurs in the detector, ground is closed to lead 14INC. Relay 3KE operates, locks to ground at 10BN, closes ground to lead 12ZT of the transender, opens the circuit to relay 2KA, opens lead 1HOLD from relay 4KB and opens the locking ground to the code storage relay groups 1 through 7. Relay 2KA restores, closes ground to the guard lead 2GD and opens the start lead 2ST. Relay 4KB restores, opens the circuit to bar magnet 14BR, and 1KD, and removes ground from lead 2CL. Bar relay 14BR restores. Relay 1KD restores and replaces the positive detector battery, with ground on lead 2CL.

In spite of the fact that a fault occurred, the subscriber continues dialing the remaining digits. After the seventh or tenth digit has been dialed, switch 16SS advances its wipers to bank terminal N and closes ground from springs 6BA3, 12CA7 level B wipers of switch 16SS, 3KE1, 11CB3, the first winding of relay 3DD, 9H3, 12SF1 to the transender via lead 12FT. If there is no possibility of an eighth or eleventh digit relay 3DD will operate immediately from resistance battery encountered on the transender lead 12FT. If there is a possibility of an eighth or eleventh digit, a time-delayed circuit is encountered on lead 12FT and relay 3DD will operate on a time-delay basis unless an eighth or eleventh digit is dialed.

If an eighth or eleventh digit is dialed, relay 3DD will operate upon completion of the digit during the interval when relay 12CA is restored, and relay 11CB remains operated. When switch 16SS steps to bank contact number one, ground via the level A wiper operates relay 10TE. Relay 10TE upon operating extends ground potential to the transender circuit via lead 12FT. The transender returns immediate resistance battery via lead 12FT and completes a circuit to the number one winding of relay 3DD.

When relay 3DD operates, locks through its second winding to ground potential at the contacts of relay 10BN, opens the circuit to its first winding, closes a circuit to the first winding of relay 2DB and lead 2DG, removes ground from lead 2ZT, and replaces ground on lead 2TL with resistance ground through the second winding of relay 7AA.

The call is now handled by a "checking" operator and further operation is the same as explained in succeeding section.

REMOTE ACCESS CALLS FOR CHECKING OPERATOR SERVICE

When stations of a remote exchange which are not provided with individual station identifying equipment are provided toll service via this equipment then, the calling number is verbally obtained from the calling party by a checking operator who keys the number into the Ticketer. When seized from an Incoming Selector, most operations are identical to those previously described with the following exceptions: No automatic detection is made of the calling number. Relays 9PA, 14PB, 14PC, 2KA, 4KB, and 3SR do not operate at any time. Relay 1DA, on the other hand, will operate only when seized by the Incoming Selector. Those operations which are materially different for remote access calls from an Incoming Selector are described below.

SEIZURE FROM INCOMING SELECTOR

Resistance 6R7 battery on lead 2CL marks this switch idle to preceding incoming selectors. When seized, the "tip" side of the subscriber's loop is closed via lead 2TL through polar relay 9PA and lamp 9L to exchange battery, and the "ring" side of the subscriber's loop is closed via lead 1RD, through the first winding of relay 1DA and the first winding of relay 7AA, and resistor 5R6 to spotter battery. Relay 1DA operates in series with relay 7AA, closes a circuit to relay 1KD which operates and closes detector battery to lead 2CL for a class marking, prepares its holding circuit and prepares the circuit of relay 3KE. Relay 7AA operates and closes a circuit to relay 5AB, the first winding of relay 6BA, and 10BN. Relay 6BA operates, closes a circuit to the first winding of relay 4BB, and closes ground to lead 2CL to hold the preceding equipment and mark this circuit busy. Relay 5AB operates, closes a circuit to relay 6BS, and grounds lead 5TCA. Relay 10BN operates, closes a circuit to relay 12SF and lead 12G to lead 10M of the Transender Hunter. Relay 4BB operates, closes a holding path to the second winding of relay 1DA, closes ground to lead 2HU to provide an additional busy mark to the Incoming Trunk circuit, closes the supy lamp 4SL to lead 2SL and removes ground from lead 5TCA. Relay 6BS operates, shorts the first winding of relay 1DA and closes direct ground to lead 2SL and the supy lamp 4SL. The supy lamp 4SL lights brightly to indicate that the Ticketer has been seized.

If the associated Transender is busy, ground appears on lead 12G, thus shorting relay 12SF and causing the Transender Hunter to search for an idle Transender. When an idle Transender is found, absence of ground appears on lead 12G. Relay 12SF operates in series with the rotary switch in the transender hunter via lead 10M, grounds lead 12G to mark the associated transender busy, closes a circuit to the first winding of relay 12SH, and replaces resistance ground with direct ground for holding the codel storage relays. Relay 12SH operates, extends leads 12SR and 12ST of the transender to leads 5R and 5T of the Ticketer Selector, closes a locking path for relay 12SF from the transender via lead 12HT, extends leads 12XT, 12YT, and 12ZT, and opens lead 10M.

DIALING THE CALLED NUMBER FOR SEVEN, EIGHT, TEN OR ELEVEN DIGIT CALLS

The subscriber dials the digits of the called number and registration takes place as described in the earlier sections.

CALLING FOR AN OPERATOR

Relay 2DG operates from ground on lead 2STG, locks, closes a circuit to the second winding of relay 12SH to lead 12STG to maintain a resistance battery on it, closes the first winding of relay 2DB to lead 2DG as stopping battery for the operator's link circuit, and closes ground to lead 2GTH. Ground on lead 2GTH and resistance battery on lead 2DG causes an Operator Link Distributor to hunt for an idle Operator Link which, in turn, hunts for the calling ticketer. Resistance battery on lead 2DG causes the link to stop on this circuit and, thus closes a circuit to relay 2DB. Relay 2DB of this circuit operates, locks on its record winding, opens the circuit of relay 2DG, prepares to replace battery with ground on lead 2DG, opens lead 1TWG, and closes ground to switch 18SD via its interrupter and off-normal springs. Relay 2DG restores, opens lead 2GTH, and closes ground to lead 2DG to mark this switch busy to searching Operator Links. Switch 18SD operates and restores, via its interrupter springs, to step its wipers to the 1st bank terminal.

When the Operator Link is connected with the Calling Ticketer, the call waiting lamps light at the Operator's Position Equipment.

When the calling Operator's Link is found, the operator's transmission circuit is extended into the operator's link and into the Ticketer via leads 10DR and 7DT. The operator's key set leads are extended into Operator's Link relays (not shown) which, when operated, extend the operator's keyed signals into the Ticketer over leads 18DW, 18DX, 18DY, 18DZ, 18DS, 10DE and 10DF.

The Operator Link circuit generates a zip-zip tone upon connection with the Operator's Position equipment circuit. If then, for a timed interval, applies the 200-ohm winding of an Operator Trunk relay (not shown) to the Ticketer 1DP lead. Thus, if the Ticketer relay 12CA is not operated, causes operation of the Ticketer relay 4DC.

When relay 4DC operates, it reverses battery to check for the origin of the call. (If the call comes from a paystation, the operator receives a paystation tone via leads 10DR and 7DT). After the timed interval, relay 4DC restores.

The operator acquires the calling number verbally from the subscriber and keys this number via the sender control circuit, the operator's position circuit, and the operator's trunk circuit to the Ticketer. Each key operates closes the circuit to various relays (not shown) in the Operator's Trunk which, in turn, close ground to magnet 18SD via lead 18DS and to the various 18DW, 18DX, 18DY and 18DZ leads.

The various codel storage relays in codel storage groups 1 through 7 operate and lock to store the calling party's number as the number is keyed by the operator.

After the last digit of the calling number is keyed (codel storage group 7 operated) and ground is removed from lead 18DS, switch 18SD restores and advances its wipers to bank terminal 8. The operator now depresses the start key which again closes the circuit to magnet 18SD. When the key is released, magnet 18SD restores and advances its wipers to bank terminal 9 to close the circuit to relay 1KC, bank terminal 9 of level B, to ground at relay 3DD. Relay 1KC operates, locks, closes battery potential through magnet 16OS, to lead 12SC of the Transender to start its sending cycle as previously described and opens the original operate circuit of relay 2DB which is also the holding circuit for the Operator's Trunk. The operator's trunk circuit releases.

Sending starts immediately after the operator has keyed in the first digit of the calling number. When switch 18SD steps to bank terminal 2 after the first digit has been keyed, a circuit is closed to relay 1DK. Relay 1DK operates, locks to relay 1KC, closes ground from contacts of relay 10BN to bank terminal 9 of switch 16OS, and closes battery through magnet 16OS, to lead 12SC if the Transender is to start its sending cycle as previously described. If an error is made in keying or the operator is slow to key in the calling number, the ground on bank terminal 9 of switch 16OS operates relay 2PS and prevents the Transender from sending the remaining digits. When switch 18SD steps to bank terminals 9, the circuit to relay 1KC is closed. Relay 1KC operates and opens the circuit to relay 1DK. Relay 1DK restores and removes the ground from relay 2PS. The Transender can now complete the call. If during the regular calling number registration cycle, the operator actuates the error key, a circuit is momentarily closed to the first winding of relay 11DE. Relay 11DE operates, locks on its second winding to ground on the level A bank terminals of switch 18SD, opens the holding circuit to codel storage relays groups 1 through 7, and closes the circuit to magnet 18SD. Switch 18SD steps self-interrupted to position 1 and opens the circuit to the first winding of relay 11DE. Relay 11DE restores. The operator may now restart the keying operation. When the operator has keyed in the first three (ABC) digits of the calling number, the Ticketer makes a comparison check of these digits with the ABC digits of the called number. If the ABC digits match, it is an indication that the calling subscriber has either dialed his own number or passed the called number to the operator. Under this condition, switch 18SD advances its wipers to bank contact number four and closes ground potential via wiper B of switch 18SD, the chain through contacts of relays associated with codel storage relay groups 1, 21, 2, 22, 3, 23, contacts 3DD5 to the first winding of relay 11DE. Relay 11DE operates as previously described.

If the operator actuates the start and error keys simultaneously, ground is closed to the first winding of relay 7HC via lead 10DF. Relay 7HC operates, locks, and closes a circuit to the first winding of relay 10FC. Relay 10FC operates, locks, opens the holding circuit for the Operator's Trunk, opens the circuit to relay 12SH, and closes busy tone through 10C4 to leads 1RD and 1RU. Relay 12SH restores and opens the circuit to relay 12SF. Relay 12SF restores. This circuit remains thus operated until the calling party disconnects.

SWITCH-THROUGH

Switch-through is the same as previously described except relay 3DD restores upon the restoration of relay 10BN.

RELEASE FROM COMPLETED AND TIMED CALL

Release is the same as explained with the following exceptions: Relay 1DA restores when relay 4BB restores and relay 8BD restores when relay 6BS restores, and relay 1KD restores when relay 1DA restores.

REMOTE ACCESS CALLS FOR AUTOMATIC NUMBER IDENTIFICATION SERVICE

When seized from an Incoming Trunk circuit, most operations are identical to those previously described with the following exceptions: Relays 7HA, 2KA, 4KB, 9PA and 14PB do not operate at any time. Relay 3SR, on the other hand, will operate only when seized by the Incoming Trunk circuit.

Detection of the calling party number is performed in the branch office. Only the called number is repeated to this circuit as loop pulses on leads 1RU and 2TL. Those operations which are materially different for a call originated from the branch office are described.

SEIZURE FROM INCOMING TRUNK CIRCUIT

Resistance 6R7 battery on lead 2CL and absence of ground on lead 2HU marks this switch idle to the Incoming Trunk circuit. When seized by the Incoming Trunk circuit, a loop is closed over leads 1RU and 2TL to relay 9PA, the first winding of relay 7AA and the first winding of relay 9HB. The cycle of operations for seizure from the Incoming Trunk circuit is identical to seizure from a local selector as described earlier, except that in addition, relay 9HB operates on its first winding in series with the first winding of relay 7AA upon seizure, and closes a circuit to relay 1KD which operates and closes detector battery to lead 2CL for a class marking.

Relay 9HB prevents relay 7HA from operating, and prepares a path for relay 5HD and the second winding of relay 9HB. When relay 10BN operates, it closes a circuit to relay 5HD and closes a holding path to the second winding of relay 9HB. When relay 6BS operates, it short circuits the first winding of relay 9HB.

Relay 5HD operates, closes a circuit to magnet 18PS, momentarily closes the second winding of relay 7AA while transferring the "tip" side of the line (lead 2TL) from relay 9PA to ground and the "ring" side of the line (lead 1RU) from spotter battery to exchange battery.

TRANSFERRING CALLING PARTY'S NUMBER TO TICKETER

The calling party's number is detected by a Detector in the branch office and stored on codel relays in the Outgoing Trunk circuit. After the third digit of the called number is completed, the Outgoing Trunk circuit begins transferring the calling party's number over the "tip" side of the trunk to the Incoming Trunk circuit which repeats the information to the Ticketer, over leads 2ULO and 2UHI. This transfer is performed in the following manner.

A rotary switch in the Outgoing Trunk circuit steps and scans, one lead at a time, across the stored information. When a grounded code lead is encountered, the Outgoing Trunk circuit closes a +80 v. D.C. pulse over the "tip" side of the trunk to the Incoming Trunk circuit which in turn closes a ground pulse simultaneously to leads 2UHI and 2ULO. When an ungrounded (open) lead is encountered, the Outgoing Trunk closes a −48 v. D.C. pulse over the "tip" side of the trunk to the Incoming Trunk circuit which in turn closes a ground pulse to only lead 2UHI.

Each pulse on lead 2UHI operates magnet 18PS and thus keeps switch 18PS in unison with the transmitting switch in the Outgoing Trunk circuit. When a pulse is closed to lead 2ULO, the relay to which the levels A, B, or C wipers of switch 18PS are at that time connected operates and locks. This enables the stored calling party's number in the Outgoing Trunk circuit to be transferred and stored in the Ticketer. Level D of switch 18PS serves no function for calls originated in a branch office.

COMPLETE DETECTION

If a complete detection has been registered in the Outgoing Trunk circuit in the branch office, a series of thirty-one ground pulses is closed to lead 2UHT. As the first pulse is closed to lead 2UHI, a pulse will not be closed to lead 2ULO. The first pulse on lead 2UHI energizes magnet 18PS and relay 3SR. Relay 3SR, being slow-to-release, operates and remains operated for the duration of the pulse.

After the first pulse, switch 18PS advances its level A wipers to bank terminal one and closes its off-normal springs. As the next twenty-nine pulses are closed to lead 2UHI, first the level A then level B and level C wipers of switch 18PS scan codels 1 through 7. Each time a pulse is closed simultaneously to lead 2ULO and 2UHI, the respective codel relay to which the level A, B, or C wiper is at that time connected operates and locks.

After the thirtieth pulse the level C wiper of switch 18PS advances to bank terminal 8. As the thirty-first pulse is closed to lead 2UHI, a pulse is simultaneously closed to lead 2ULO. Relay 1KC operates on this pulse, locks, closes ground to lead 1UML and closes resistance battery to lead 12SC. After the thirty-first pulse, switch 18PS advances its wipers one step and relay 3SR restores and opens lead 1TCM.

INCOMPLETE DETECTION

If an incomplete detection is registered in the Outgoing Trunk, only one pulse is closed to lead 2UHI. Magnet 18PS and relay 3SR operate from this pulse. After the pulse, switch 18PS advances its wipers one step and closes its off-normal springs. Relay 3SR, being slow-to-release, remains operated for a short period. As no more pulses are closed to lead 2UHI, relay 3SR restores and closes ground on springs 4BB3 to relay 3KE. Relay 3KE operates, locks, closes ground to lead 12ZT, and closes ground to lead 1UML. Subsequent action is the same as explained earlier except lead 1UML is opened when relay 3DD operates.

If any irregularity occurs and the full complement of thirty-one pulses is not closed to lead 2UHI or if the thirty-first pulse is not closed simultaneously to leads 2UHI and 2ULO, operation is the same as for an incomplete detection.

GROUND FAULT ON LINE

If a ground fault condition is registered in the Outgoing Trunk, leads 2UHI and 2ULO are simultaneously grounded on the first pulse. Relay 5GT operates from the pulse on lead 2ULO, locks through its "X" contacts 5GT7, and closes ground to lead 12YT. Magnets 15PS and relay 3SR operate from the pulse on lead 2UHI. After the pulse, switch 18PS advances its wipers to the next bank terminal. Further operation of this circuit is the same as explained in an earlier section.

SWITCH-THROUGH

Switch-through, after sending is completed, is performed in the same manner as described in the section for calls originated from the main office except that when relay 10BN restores, ground is removed from lead 1UML to cause the Incoming Trunk to switch through the transmission path.

IDLE TRANSENDER NOT AVAILABLE

If a Transender has not been seized by the time the first digit of the called number is dialed, relays 12SF and 12SH will not have operated and subsequent operation occurs in the following manner. As relay 7AA restores on the first dial pulse of the called number, it closes a circuit to relay 12CA. Relay 12CA operates and closes a circuit to the first winding of relay 7HC. Relay 7HC operates and locks on its second winding, closes a circuit to the first winding of relay 10FC, and closes ground to lead 1UML. If the call is from the branch office, this ground condition on lead 1UML starts action in the Outgoing Trunk in the branch office to provide busy tone to the calling party. Relay 10FC operates its "X" contacts 10FC5, locks on its second winding, closes busy tone through 10C4 to lead 1RU, opens its first winding, closes ground to lead 1RLS, opens lead 1UML, closes a holding circuit to the second winding of relay 4BB, and removes the operating ground for magnet 16SS and codels 21 through 31. The circuit remains thus operated until the calling party disconnects.

When the calling party disconnects, release is similar to that described in an earlier section.

CHANGE OF TOLL RATES DURING CALL

Each time the Dater Timer changes the toll rates from day to night rates or night to day rates, it closes a ground pulse to lead 19TR. If a conversation is in progress in this circuit, the off-normal springs of switch 19SEND are operated and the pulse on lead 19TR closes a circuit to relay 13TR. Relay 13TR operates, locks, and closes ground to the level D bank terminal of switch 19SEND. Relay 13TR remains operated until relay 4BB restores on release.

CALL SUPERVISION

As long as the Ticketer is in use, the supy lamp 4SL is lighted or flashing to indicate the following conditions:

| | |
|---|---|
| Bright steady lamp | Ticketer seized. |
| Dim flashing lamp (60 I.P.M.) | Called answered, "grace" period preceding conversation timing or a stop dial condition. |
| Dim Steady lamp | Called answered, Ticketer timing the conversation. |
| Dim flashing lamp (120 I.P.M.) | Call completed, ticketer calling for a tabulator and transferring ticket data to it. |
| Bright flashing lamp (120 I.P.M.) | Ticket data transferred, Ticketer in process of releasing. |
| Bright flashing lamp (60 I.P.M.) | Conversation interval 180 minutes maximum. |

PAYSTATION TONE CHECK

If a call originates from a paystation and the subscriber dials the toll access code and the called number, the ticketer will function as explained in the early sections. However, since the call is from a paystation, a detection cannot be made of the calling party. The call is then routed to an Operator for verification.

While one embodiment of the invention has been disclosed, it will be understood that various modifications may be made therein which are within the true spirit and scope of the invention.

What is claimed is:

1. In an automatic toll ticketing telephone system, an exchange including, a first exchange battery, and a second battery, a calling line having a plurality of stations including a first station and a calling second station, a dial at said second station, a resistance ground connection at said dial, means at said dial to ground one side of the line between pulses of a dialed digit, a ticketer including a plurality of recording means for storing dialed digits and the calling party identity, means for extending calls from said line into said ticketer, a line relay and a polar relay in said ticketer, circuit means comprising said line relay connected in series with said line, said calling station and the terminals of said second battery, with said first battery connected between ground and a terminal of said polar relay whereby said line relay is operated from said second battery to follow the pulses from said calling station, other means including said circuit means and said ground impulses from said dial to operate said polar relay, second circuit means operated in response to the operation of said polar relay to operate one of said recording means to register said second party as the calling party, said recorders operated in response to impulses dialed thereinto, switching means operated by said ticketer in response to the extension of a call to said ticketer, interrupter circuit means in said switching means thereafter operated self-interruptedly to operate said switching means during the interval of the dialing of a first of said dialed digits to connect with an available register, means including said line relay thereafter operated to repeat subsequent digits to said register via said switching means simultaneously with their storage in the recorder means, and other means operated simultaneously with the repetition of said subsequent digits to forward said first stored digit from said recorder to said register.

2. In an automatic toll ticketing telephone system, an exchange including, a first exchange battery, and a second battery, a calling line having a plurality of stations including a first station and a calling second station, a dial at said second station, a resistance ground connection at said dial, means at said dial to ground one side of the line between pulses of a dialed digit, a ticketer including a plurality of recording means for storing dialed digits and the calling party identity, means for extending calls from said line into said ticketer, a line relay a polar relay in said ticketer and a first party relay, back contacts on said line relay, make contacts on said polar relay, circuit means comprising said line relay connected in series with said line, said calling station and the terminals of said second battery, with said battery connected between ground and a terminal of said polar relay whereby said line relay is operated from said second battery to follow the pulses from said calling station, other means including said circuit means, a connection of said polar relay to said line and said ground impulses from said dial to operate said polar relay, second circuit means including said back contacts and said make contacts operated in response to the operation of said polar relay to operate said first party marking relay, third circuit means operated in response to the operation of said first party relay to said second party as the calling party, said recorders operated in response to impulses dialed thereinto, switching means operated by said ticketer in response to the extension of a call to said ticketer, interrupter circuit means in said switching means, thereafter operated self-interruptedly to operate said switching means during the interval of the dialing of a first of said dialed digits to connect with an available register, means including said line relay thereafter operated to repeat subsequent digits to said register via said switching means simultaneously with their storage in the recorder means, and other means operated simultaneously with repetition of said subsequent digits to forward said first stored digit from said recorder to said register.

3. A telephone system as claimed in claim 2, including a third station on said line, make contacts on said line relay, make contacts on said polar relay and a second party relay, said third station including a dial arranged to send a momentary ground impulse after the last line break of a first dialed digit, third circuit means including said make contacts on said line relay, said make contacts on said polar relay to operate said second party relay in response to a pulse from said third station dial, fourth circuit means operated in response to the operation of said second party relay to operate said one of said recording means to register said third station as the calling party station.

4. A telephone system as claimed in claim 2 including a fourth station on said line, make contacts on said line relay, make contacts on said polar relay and a second party relay, locking circuits on said party relays, said fourth station including a dial arranged to send a ground pulse before the final line break of a first dialed digit and lasting into the succeeding line closure, third circuit means including said make contacts on said line relay, said make contacts on said polar relay to operate said second party relay in response to said pulse from said fourth station dial, fifth circuit means including said second circuit means and said third circuit means to operate said one of said recording means to register said fourth station as the calling party station.

5. A telephone system as claimed in claim 3 including a fourth station on said line, said fourth station including a dial arranged to send a ground pulse before the final break of a first dialed digit and lasting into the succeeding line closure, locking circuits operated by said second party relay to respectively lock said relays upon their operation, fifth circuit means including said second and said third circuit means to operate said one of said recording means to register said fourth station as the calling party station.

6. In an automatic toll ticketing telephone system, a subscriber line including a station equipped with a dial, toll ticketing equipment including a ticketer, a group of translator senders and connecting means for operatively associating a free translator-sender with a ticketer, dial controlled switching means for extending a connection from said station to said ticketer, said ticketer including, a line relay, a plurality of groups of storage relays, initiating means in said ticketer operated upon access of said ticketer to initiate the operation of said connecting means, a first rotary-switch operated by said line relay a number of steps corresponding to the value of the first dialed digit, a second rotary-switch and circuit means operated by said line relay to encode each dialed digit, a third rotary-switch operated once for each series of operations of said line relay corresponding to a digit to allot sequentially one of said groups of storage relays to said second rotary switch, means thereafter operated in response to the complete dialing of a digit to operate said selected group of storage relays, said connecting means including interrupter circuit means operated in response to said initiating means to complete the connecting operation during the interval of the dialing of a first digit, other means operated upon said completed connection after the complete dialing of a first digit to repeat subsequent digits to said translator-sender simultaneously with their encoding and storage, second circuit means including said first rotary-switch to forward the quantity of ten minus the dialed number of pulses to said translator-sender simultaneously with the subscriber dialing of the second digit.

7. In an automatic toll ticketing telephone system, an exchange including a first exchange battery and a second battery, a calling line including a plurality of stations equipped with dials, a second one of said station equipped with a dial arranged to ground one side of said line between pulses of a dialed digit, toll ticketing equipment including a ticketer, a group of translator senders and connecting means for operatively associating a free translator-sender with a ticketer, switch means operated in response to the operation of said dial to extend a connection from said station to said ticketer, said ticketer including, a line relay, a polar relay, a first party relay and a plurality of groups of storage relays, initiating means in said ticketer operated upon access of said ticketer to initiate the operation of said connecting means, first circuit means comprising said line relay connected in series with said line, said station and the terminals of said second battery, with said first battery connected between ground and a terminal of said polar relay, with the polar relay connected by one terminal to said line, whereby said line relay is operated from said second battery to follow the pulses from said calling station dial, said polar relay operated during pulsing by pulses from said dial ground, second circuit means conditioned by an unoperated line relay and an operated polar relay to operate said first party relay, third circuit means operated in response to the operation of said party relay to record said second party as the calling party, a first rotary-switch operated by said line relay a number of steps corresponding to the value of the first dialed digit, a second rotary-switch and circuit means operated by said line relay to encode each dialed digit, a third rotary-switch operated once for each digital series of operations of said line relay to allot sequentially one of said groups of storage relays to said second rotary switch, means thereafter operated in response to the complete dialing of a digit to operate said selected group of storage relays, said connecting means operation completed during the interval of the dialing of a first digit, other means operated upon said completed connection after the complete dialing of a first digit to repeat subsequent digits to said translator-sender simultaneously with their encoding and storage, third circuit means including said first rotary-switch to forward the quantity of ten minus the dialed number of pulses to said translator-sender simultaneously with the subscriber dialing of the second digit.

8. A telephone system is claimed in claim 7, including a third station on said line, make contacts on said line relay, make contacts on said polar relay and a second party relay, said third station including a dial arranged to send a momentary ground impulse after the last line break of a first dialed digit, fourth circuit means including said make contacts on said line relay, said make contacts on said polar relay to operate said second party relay in response to a pulse from said third station dial, fifth circuit means operated in response to the operation of said second party relay to record said third station as the calling party station.

9. A telephone system as claimed in claim 7 including a fourth station on said line, make contacts on said line relay, make contacts on said polar relay and a second party relay, locking circuits on said party relays, said fourth station including a dial arranged to send a ground pulse before the final line break of a first dialed digit and lasting into the succeeding line closure, fourth circuit means including said make contacts on said line relay, said make contacts on said polar relay to operate said second party relay in response to said pulse from said fourth station dial, sixth circuit means including said second circuit means and said third circuit means to record said fourth station as the calling party station.

10. A telephone system as claimed in claim 8 including a fourth station on said line, said fourth station including a dial arranged to send a ground pulse before the final break of a first dialed digit and lasting into the succeeding line closure, locking circuits operated by said first and said second party relay to respectively lock said relays upon their operation, sixth circuit means including said second and said fourth circuit means to record said fourth station as the calling party station.

11. In an automatic toll ticketing telephone system, an exchange including, a first exchange battery and a second battery, a calling line including a plurality of stations equipped with dials, a second one of said stations equipped with a dial arranged to ground one side of said line between pulses of a dialed digit, toll ticketing equipment including a ticketer, a group of translator senders and connecting means for operatively associating a free translator-sender with a ticketer, switching means operated in response to the operation of said dial to extend a connection from said station to said ticketer, said ticketer including, a line relay, a polar relay, a first party relay and a plurality of groups of storage relays, initiating means in said ticketer operated upon access of said ticketer to initiate the operation of said connecting means, first circuit means comprising said line relay connected in series with said line, said station and the terminals of said battery, with said first battery connected between ground and a terminal of said polar relay, with the polar relay connected by one terminal to said line, whereby said line relay is operated from said second battery to follow the pulses from said calling station dial, said polar relay operated during pulsing by pulses from said dial ground, second circuit means conditioned by an unoperated line relay and an operated polar relay to operate said first party relay, third circuit means operated in response to the operation of said party relay to record said second party as the calling party, a first rotary-switch operated by said line relay a number of steps corresponding to the value of a first dialed digit, a second rotary-switch and circuit means operated by said line relay to encode each dialed digit, a third rotary-switch operated once for each digital series of operations of said line relay to allot sequentially one of said groups of storage relays to said second rotary switch, means thereafter operated in response to the complete dialing of a digit to operate said selected group of storage relays, said connecting means operation completed during the interval of the dialing of a first digit, relay means operated upon the completed dialing of a first digit to operatively disconnect said first rotary switch from said line relay, other means operated upon said completed connection after the complete dialing of a first digit to repeat subsequent digits to said translator-sender simultaneously with their encoding and storage, third circuit means including said first rotary-switch to forward the quantity of ten minus the dialed number of pulses to said translator-sender simultaneously with the subscriber dialing of the second digit.

12. A telephone system as claimed in claim 11 including a line detector, and circuit transfer means in said ticketer operated responsive to said third rotary switch stepping to a third position following the completed dialing of a second digit to replace said second battery with said first battery whereby said line relay will subsequently operate from said first battery potential, while said polar-relay and second battery are operatively removed from the circuit.

13. A telephone system as claimed in claim 11 including a calling line identity detector, and circuit transfer means in said ticketer operated responsive to said third rotary switch stepping to a third position following the completed dialing of a second digit to replace said second battery with said first battery whereby said line relay will subsequently operate from said first battery potential, while said polar-relay and second battery are operatively removed from the circuit, circuit calling means operated in response to the operation of said last mentioned means to operatively connect said detector to said ticketer, others of said plurality of groups of storage relays operated to store said calling station identity in response to said connection.

14. In an automatic toll ticketing telephone system, an exchange including, a first exchange battery and a second battery, a calling line including a plurality of stations equipped with dials, a second one of said stations equipped with a dial arranged to ground one side of said line between pulses of a dialed digit, toll ticketing equipment including a ticketer, a calling line identity detector a group of translator senders and connecting means for operatively associating a free translator-sender with a ticketer, switching means operated in response to the operation of said dial to extend a connection from said station to said ticketer, said ticketer including, a line relay, a polar relay, a first party relay and a plurality of groups of storage relays, initiating means in said ticketer operated upon access of said ticketer to initiate the operation of said connecting means, first circuit means comprising said line relay connected in series with said line, said station and the terminals of said battery, with said first battery connected between ground and a terminal of said polar relay, with the polar relay connected by one terminal to said line, whereby said line relay is operated from said second battery to follow the pulses from said calling station dial, said polar relay operated during pulsing by pulses from said dial ground, second circuit means conditioned by an unoperated line relay and an operated polar relay to operate said first party relay, third circuit means operated in response to the operation of said party relay to record said second party as the calling party, a first rotary-switch operated by said line relay a number of steps corresponding to the value of a first dialed digit, a second rotary-switch and circuit means operated by said line relay to encode each dialed digit, a third rotary-switch operated once for each digital series of operations of said line relay to allot sequentially one of said groups of storage relays to said second rotary switch, means thereafter operated in response to the complete dialing of a digit to operate said selected group of storage relays, said connecting means operation completed during the interval of the dialing of a first digit, relay means operated upon the completed dialing of a first digit to operatively disconnect said first rotary switch from said line relay, other means operated upon said completed connection after the complete dialing of a first digit to repeat subsequent digits to said translator-sender simultaneously with their encoding and storage, third circuit means including said first rotary-switch to forward the quantity of ten minus the dialed number of pulses to said translator-sender simultaneously with the subscribed dialing of the second digit circuit transfer means in said ticketer operated responsive to said third rotary switch stepping to a third position following the completed dialing of a second digit to replace said second battery with said first battery whereby said line relay will subsequently operate from said first battery potential, while said polar-relay and second battery are operatively removed from the circuit, circuit calling means operated in response to the operation of said last mentioned means to operatively connect said detector to said ticketer, others of said plurality of groups of storage relays operated to store said calling station identity.

15. A system as claimed in claim 14 including an operator position, and second connecting means in said ticketer operated upon failure of said detector to obtain said calling station identity to connect said subscriber with said operator position.

16. A system as claimed in claim 14 including an operator position, and second connecting means in said ticketer operated upon failure of said detector to obtain said calling station identity to connect said subscriber with said operator position, a fourth rotary switch in said ticketer operatively conditioned by said last mentioned means to access said others of said plurality of groups of storage relays whereby said operator position is effective to operate them.

17. In an automatic toll ticketing system, a first exchange including, a first exchange battery and a second battery, a calling line including a plurality of stations equipped with dials, a second one of said stations equipped with a dial arranged to ground one side of said line between pulses of a dialed digit, toll ticketing equipment including a ticketer with a first, a second, and a third access path, a calling line identity detector, a group of translator senders, an operator position operatively associated with said ticketer, and connecting means for operatively associating a free translator-sender with a ticketer, switching means operated in response to the operation of said dial to extend a connection from said station to said ticketer via a first access, said ticketer including, a line relay, a polar relay, a first party relay and a plurality of groups of storage relays, initiating means in said ticketer operated upon access of said ticketer to initiate the operation of said connecting means, first circuit means comprising said line relay connected in series with said line, said station and the terminals of said battery, with said first battery connected between ground and a terminal of said polar relay, with the polar relay connected by one terminal to said line, whereby said line relay is operated from said second battery to follow the pulses from said calling station dial, said polar relay operated during pulsing by pulses from said dial ground, second circuit means conditioned by an unoperated line relay and an operated polar relay to operate said first party relay, third circuit means operated in response to the operation of said party relay to record said second party as the calling party, a first rotary-switch operated by said line relay a number of steps corresopnding to the value of a first dialed digit, a second rotary-switch and circuit means operated by said line relay to encode each dialed digit, a third rotary-switch operated once for each digital series of operations of said line relay to allot sequentially one of said groups of storage relays to said second rotary switch, means thereafter operated in response to the complete dialing of a digit to operate said selected group of storage relays, said connecting means operation completed during the interval of the dialing of a first digit, relay means operated upon the completed dialing of the first digit to operatively disconnect said first rotary switch from said line relay, other means operated upon said completed connection after the complete dialing of a first digit to repeat subsequent digits to said translator-sender simultaneously with their encoding and storage, third circuit means including said first rotary-switch to forward the quantity of ten minus the dialed number of pulses to said translator-sender simultaneously with the subscriber dialing of the second digit, circuit transfers means in said ticketer operated responsive to said third rotary switch stepping to a third position following the completed dialing of a second digit to replace said second battery with said first battery whereby said line relay will subsequently operate from said first battery potential, while said polar-relay and second battery are operatively removed from the circuit, circuit calling means operated in response to the operation of said last mentioned means to operatively connect said detector to said ticketer, means operated in response to the connection of and operation of said detector to connect others of said plurality of groups of storage relays to operate and store said calling station identity, and including supervisory relay means operated upon a failure of said detector to supply the calling station identity to operatively connect said operator position to said calling line, whereby the calling number may be orally obtained.

18. In an automatic toll ticketing telephone system as set forth in claim 17, a second branch exchange provided with second switching apparatus, a second subscriber station equipped with a dial identified by a plural digit directory number, dial controlled means operated to connect said second exchange subscriber via said first exchange switching equipment to said ticketer via a second three conductor access path and including disabling means in said first exchange ticketer operated upon seizure via said second access path to disable said first party relay and associated line and station detecting means, a fourth rotary switch in said ticketer, operator connecting means in said ticketer operated upon seizure via said second access path upon the completion dialing by said second exchange calling subscriber to connect said operator position to said calling subscriber line, whereby the calling subscriber directory number may be orally obtained, and including operator circuit means including said fourth rotary switch to allot said others of said plurality of groups of storage relays to operate and store said calling station identity.

19. In an automatic toll ticketing telephone system as set forth in claim 17 a second branch exchange provided with second switching apparatus, a second subscriber station equipped with a dial identified by a plural digit directory number, dial controlled means operated to connect said second exchange subscriber via said first exchange switching equipment to said ticketer via a second three conductor access path and including disabling means in said first exchange ticketer operated upon seizure via said second access path to disable said first party relay and associated line and station detecting means, a fourth rotary switch in said ticketer, warning means in said ticketer operated upon seizure via said second path to place an increased potential on a control one of said three conductors to inform the associated equipment of this call originating in a branch exchange, operator connecting means in said ticketer operated upon seizure via said second access path upon the completion dialing by said second exchange calling subscriber to connect said operator position to said calling subscriber line, whereby the calling subscriber directory number may be orally obtained, and including operator circuit means including said fourth rotary switch to allot said others of said plurality of groups of storage relays to operate and store said calling station identity.

20. In an automatic toll ticketing telephone system as set forth in claim 17, a third branch exchange provided with switching apparatus, an outgoing toll trunk repeater and a calling line detector, a branch office subscriber station equipped with a dial and identified by a plural digit directory number, dial controlled means operated to connect said second exchange subscriber to said toll trunk repeater whereby said toll trunk repeater and said detector obtain said calling directory number, an incoming repeater in said first exchange, a trunk line tying said repeaters, said first exchange repeater connected to said ticketer via said third access path, means in said ticketer operated upon seizure via said third access path to disable said first party relay, said first rotary switch and detector equipment, enabling means subsequently operated to place said first rotary switch under control of said first exchange repeater to operatively allot others of said plurality of groups of storage relays to store said calling station identity as obtained from said third exchange repeater.

21. In an automatic toll ticketing telephone system as set forth in claim 17, a defective calling line having a ground leak, said ticketer including a second party and alarm circuit means completed in response to the almost simultaneous operation of said polar relay, said first and said second party relays to operate an alarm relay, means operated in response to the operation of said alarm relay to connect said line with said operator position.

22. In an automatic toll ticketing telephone system as set forth in claim 18 chain circuit comparison means in said ticketer operated upon receipt of a first three digits from said operator position, disconnect relay means operated upon said first three digits corresponding to the called number first three digits to disconnect said operator position.

References Cited in the file of this patent

UNITED STATES PATENTS

| | | |
|---|---|---|
| 2,352,492 | Ostline | June 27, 1944 |
| 2,447,533 | Retallack | Aug. 24, 1948 |
| 2,834,835 | Shepherd | May 13, 1958 |